(12) United States Patent
Schneider

(10) Patent No.: US 8,458,161 B2
(45) Date of Patent: Jun. 4, 2013

(54) METHOD, PRODUCT, AND APPARATUS FOR ENHANCING RESOLUTION SERVICES, REGISTRATION SERVICES, AND SEARCH SERVICES

(75) Inventor: Eric Schneider, University Heights, OH (US)

(73) Assignee: ESDR Network Solutions LLC, Wilmington, DE (US)

( * ) Notice: Subject to any disclaimer, the term of this patent is extended or adjusted under 35 U.S.C. 154(b) by 12 days.

(21) Appl. No.: 13/163,076

(22) Filed: Jun. 17, 2011

(65) Prior Publication Data

US 2011/0252059 A1 Oct. 13, 2011

Related U.S. Application Data

(60) Division of application No. 10/904,943, filed on Dec. 6, 2004, now Pat. No. 8,037,168, which is a division of application No. 09/598,134, filed on Jun. 21, 2000, now Pat. No. 6,895,430, which is a continuation-in-part of application No. 09/532,500, filed on Mar. 21, 2000, now Pat. No. 7,136,932, and a continuation-in-part of application No. 09/525,350, filed on Mar. 15, 2000, now Pat. No. 6,338,082.

(60) Provisional application No. 60/160,125, filed on Oct. 18, 1999, provisional application No. 60/143,859, filed on Jul. 15, 1999, provisional application No. 60/157,075, filed on Oct. 1, 1999, provisional application No. 60/125,531, filed on Mar. 22, 1999, provisional application No. 60/130,136, filed on Apr. 20, 1999, provisional application No. 60/175,825, filed on Jan. 13, 2000, provisional application No. 60/135,751, filed on May 25, 1999.

(51) Int. Cl.
*G06F 17/30* (2006.01)

(52) U.S. Cl.
USPC ............... 707/706; 707/707; 707/708

(58) Field of Classification Search
USPC .......................... 707/706, 707, 708
See application file for complete search history.

(56) References Cited

U.S. PATENT DOCUMENTS 4,155,042 A 5/1979 Permut et al.
(Continued)

FOREIGN PATENT DOCUMENTS

JP 54136617 10/1979
(Continued)

OTHER PUBLICATIONS

Network Solutions, Inc., Online Team up to Server Internet Needs of Small Business Owners, 1-98, pp. 1-2.
(Continued)

*Primary Examiner* — Baoquoc N To
(74) *Attorney, Agent, or Firm* — Fitch, Even, Tabin & Flannery, LLP

(57) ABSTRACT

A client computing device receives a search request including an identifier and an identifier prefix. The computing device determines the identifier prefix and generates a uniform resource locator (URL) corresponding to the identifier prefix by inserting the identifier into a template such that the URL is configured to facilitate a specific request depending on the determined identifier prefix. Alternatively, a client computing device receives a search request and retrieves a search result comprising a uniform resource identifier (URI) having a domain name. The client computing device generates a hyperlink corresponding to the search result, the hyperlink effecting access of additional information related to a resource indicated by the URI having the domain name. The computing device generates enhanced search results by combining the search result and the hyperlink. The additional information could be sitemap information, homepage information, WHOIS information, page source information, meta tag information, or other additional information.

26 Claims, 29 Drawing Sheets

U.S. PATENT DOCUMENTS

| | | |
|---|---|---|
| 4,190,800 A | 2/1980 | Kelly, Jr. et al. |
| 4,196,310 A | 4/1980 | Forman et al. |
| 4,390,876 A | 6/1983 | Bjorklund et al. |
| 4,754,326 A | 6/1988 | Kram et al. |
| 4,811,382 A | 3/1989 | Sleevi |
| 4,823,265 A | 4/1989 | Nelson |
| 4,903,206 A | 2/1990 | Itoh et al. |
| 4,956,771 A | 9/1990 | Neustaedter |
| 4,956,875 A | 9/1990 | Bernard et al. |
| 5,109,486 A | 4/1992 | Seymour |
| 5,155,837 A | 10/1992 | Liu et al. |
| 5,155,847 A | 10/1992 | Kirouac et al. |
| 5,175,681 A | 12/1992 | Iwai et al. |
| 5,231,570 A | 7/1993 | Lee |
| 5,249,230 A | 9/1993 | Mihm, Jr. |
| 5,249,275 A | 9/1993 | Srivastava |
| 5,319,699 A | 6/1994 | Kerihuel et al. |
| 5,321,740 A | 6/1994 | Gregorek et al. |
| 5,386,369 A | 1/1995 | Christiano |
| 5,402,490 A | 3/1995 | Mihm, Jr. |
| 5,404,231 A | 4/1995 | Bloomfield |
| 5,404,505 A | 4/1995 | Levinson |
| 5,418,951 A | 5/1995 | Damashek |
| 5,437,031 A | 7/1995 | Kitami |
| 5,444,823 A | 8/1995 | Nguyen |
| 5,446,891 A | 8/1995 | Kaplan et al. |
| 5,454,105 A | 9/1995 | Hatakeyama et al. |
| 5,500,561 A | 3/1996 | Wilhelm |
| 5,534,734 A | 7/1996 | Pugh et al. |
| 5,535,257 A | 7/1996 | Goldberg et al. |
| 5,544,036 A | 8/1996 | Brown, Jr. et al. |
| 5,572,438 A | 11/1996 | Ehlers et al. |
| 5,576,700 A | 11/1996 | Davis et al. |
| 5,592,620 A | 1/1997 | Chen et al. |
| 5,598,464 A | 1/1997 | Hess et al. |
| 5,600,778 A | 2/1997 | Swanson et al. |
| 5,603,034 A | 2/1997 | Swanson |
| 5,623,679 A | 4/1997 | Rivette et al. |
| 5,623,681 A | 4/1997 | Rivette et al. |
| 5,625,818 A | 4/1997 | Zarmer et al. |
| 5,634,016 A | 5/1997 | Steadham, Jr. et al. |
| 5,634,048 A | 5/1997 | Ryu et al. |
| 5,640,561 A | 6/1997 | Satoh et al. |
| 5,644,625 A | 7/1997 | Solot |
| 5,649,186 A | 7/1997 | Ferguson |
| 5,664,170 A | 9/1997 | Taylor |
| 5,673,252 A | 9/1997 | Johnson et al. |
| 5,684,710 A | 11/1997 | Ehlers et al. |
| 5,692,132 A | 11/1997 | Hogan |
| 5,696,695 A | 12/1997 | Ehlers et al. |
| 5,699,428 A | 12/1997 | McDonnal et al. |
| 5,701,399 A | 12/1997 | Lee et al. |
| 5,708,709 A | 1/1998 | Rose |
| 5,721,897 A | 2/1998 | Rubinstein |
| 5,742,818 A | 4/1998 | Shoroff et al. |
| 5,745,360 A | 4/1998 | Leone et al. |
| 5,761,083 A | 6/1998 | Brown, Jr. et al. |
| 5,761,689 A | 6/1998 | Rayson et al. |
| 5,764,906 A | 6/1998 | Edelstein et al. |
| 5,778,367 A | 7/1998 | Wesinger, Jr. et al. |
| 5,790,790 A | 8/1998 | Smith et al. |
| 5,802,524 A | 9/1998 | Flowers et al. |
| 5,812,776 A | 9/1998 | Gifford |
| 5,813,007 A | 9/1998 | Nielsen |
| 5,815,830 A | 9/1998 | Anthony |
| 5,835,087 A | 11/1998 | Herz et al. |
| 5,841,850 A | 11/1998 | Fan |
| 5,842,203 A | 11/1998 | D'Elena et al. |
| 5,848,396 A | 12/1998 | Gerace |
| 5,857,201 A | 1/1999 | Wright, Jr. et al. |
| 5,870,546 A | 2/1999 | Kirsch |
| 5,881,131 A | 3/1999 | Farris et al. |
| 5,890,172 A | 3/1999 | Borman et al. |
| 5,892,919 A | 4/1999 | Nielsen |
| 5,892,920 A | 4/1999 | Arvidsson et al. |
| 5,895,454 A | 4/1999 | Harrington |
| 5,898,836 A | 4/1999 | Freivald et al. |
| 5,907,680 A | 5/1999 | Nielsen |
| 5,908,467 A | 6/1999 | Barrett et al. |
| 5,913,215 A | 6/1999 | Rubinstein et al. |
| 5,926,116 A | 7/1999 | Kitano et al. |
| 5,933,604 A | 8/1999 | Inakoshi |
| 5,937,037 A | 8/1999 | Kamel et al. |
| 5,937,162 A | 8/1999 | Funk et al. |
| 5,940,847 A | 8/1999 | Fein et al. |
| 5,944,787 A | 8/1999 | Zoken |
| 5,949,419 A | 9/1999 | Domine et al. |
| 5,953,400 A | 9/1999 | Rosenthal et al. |
| 5,953,721 A | 9/1999 | Doi et al. |
| 5,963,205 A | 10/1999 | Sotomayor |
| 5,963,915 A | 10/1999 | Kirsh |
| 5,970,680 A | 10/1999 | Powers |
| 5,974,453 A | 10/1999 | Andersen et al. |
| 5,978,806 A | 11/1999 | Lund |
| 5,978,817 A | 11/1999 | Giannandrea et al. |
| 5,978,828 A | 11/1999 | Greer et al. |
| 5,978,842 A | 11/1999 | Noble et al. |
| 5,982,863 A | 11/1999 | Smiley et al. |
| 5,987,464 A | 11/1999 | Schneider |
| 5,987,508 A | 11/1999 | Agraharam et al. |
| 5,991,368 A | 11/1999 | Quatse et al. |
| 5,991,751 A | 11/1999 | Rivette et al. |
| 5,995,594 A | 11/1999 | Shaffer et al. |
| 5,999,907 A | 12/1999 | Donner |
| 5,999,912 A | 12/1999 | Wodarz et al. |
| 6,003,061 A | 12/1999 | Jones et al. |
| 6,003,077 A | 12/1999 | Bawden et al. |
| 6,003,082 A | 12/1999 | Gampper et al. |
| 6,006,264 A | 12/1999 | Colby et al. |
| 6,006,265 A | 12/1999 | Rangan et al. |
| 6,009,150 A | 12/1999 | Kamel et al. |
| 6,009,459 A | 12/1999 | Belfiore |
| 6,012,066 A | 1/2000 | Discount et al. |
| 6,014,660 A | 1/2000 | Lim et al. |
| 6,018,619 A | 1/2000 | Allard et al. |
| 6,018,768 A | 1/2000 | Ullman et al. |
| 6,021,433 A | 2/2000 | Payne et al. |
| 6,023,724 A | 2/2000 | Bhatia et al. |
| 6,029,195 A | 2/2000 | Herz |
| 6,032,150 A | 2/2000 | Nguyen |
| 6,038,601 A | 3/2000 | Lambert et al. |
| 6,041,324 A | 3/2000 | Earl et al. |
| 6,057,834 A | 5/2000 | Pickover |
| 6,058,250 A | 5/2000 | Harwood et al. |
| 6,058,355 A | 5/2000 | Ahmed et al. |
| 6,061,700 A | 5/2000 | Brobst et al. |
| 6,061,734 A | 5/2000 | London |
| 6,061,738 A | 5/2000 | Osaku et al. |
| 6,085,242 A | 7/2000 | Chandra |
| 6,091,956 A | 7/2000 | Hollenberg |
| 6,092,100 A | 7/2000 | Berstis et al. |
| 6,094,665 A | 7/2000 | Lyons et al. |
| 6,097,108 A | 8/2000 | Tweed |
| 6,098,099 A | 8/2000 | Ellesson et al. |
| 6,104,582 A | 8/2000 | Cannon et al. |
| 6,104,990 A | 8/2000 | Chaney et al. |
| 6,105,098 A | 8/2000 | Ninose et al. |
| 6,119,153 A | 9/2000 | Dujari et al. |
| 6,119,234 A | 9/2000 | Aziz et al. |
| 6,122,520 A | 9/2000 | Want et al. |
| 6,122,627 A | 9/2000 | Carey et al. |
| 6,125,361 A | 9/2000 | Chakrabarti et al. |
| 6,128,623 A | 10/2000 | Mattis et al. |
| 6,134,588 A | 10/2000 | Guenthner et al. |
| 6,137,873 A | 10/2000 | Gilles |
| 6,141,408 A | 10/2000 | Garfinkle |
| 6,141,653 A | 10/2000 | Conklin et al. |
| 6,148,289 A | 11/2000 | Virdy |
| 6,148,342 A | 11/2000 | Ho |
| 6,151,624 A | 11/2000 | Teare et al. |
| 6,154,600 A | 11/2000 | Newman et al. |
| 6,154,725 A | 11/2000 | Donner |
| 6,154,771 A | 11/2000 | Rangan et al. |
| 6,154,777 A | 11/2000 | Ebrahim |
| 6,157,292 A | 12/2000 | Piercy et al. |
| 6,167,389 A | 12/2000 | Davis et al. |
| 6,167,449 A | 12/2000 | Arnold et al. |

| | | |
|---|---|---|
| 6,169,476 B1 | 1/2001 | Flanagan |
| 6,173,406 B1 | 1/2001 | Wang et al. |
| 6,181,787 B1 | 1/2001 | Malik |
| 6,181,985 B1 | 1/2001 | O'Donnell et al. |
| 6,182,148 B1 | 1/2001 | Tout |
| 6,182,227 B1 | 1/2001 | Blair et al. |
| 6,185,619 B1 | 2/2001 | Joffe et al. |
| 6,189,030 B1 | 2/2001 | Kirsch et al. |
| 6,195,691 B1 | 2/2001 | Brown |
| 6,199,076 B1 | 3/2001 | Logan et al. |
| 6,202,087 B1 | 3/2001 | Gadish |
| 6,205,139 B1 | 3/2001 | Voit |
| 6,209,048 B1 | 3/2001 | Wolff |
| 6,212,565 B1 | 4/2001 | Gupta |
| 6,219,696 B1 | 4/2001 | Wynblatt et al. |
| 6,219,709 B1 | 4/2001 | Byford |
| 6,229,532 B1 | 5/2001 | Fujii |
| 6,230,168 B1 | 5/2001 | Unger et al. |
| 6,240,360 B1 | 5/2001 | Phelan |
| 6,240,555 B1 | 5/2001 | Shoff et al. |
| 6,256,671 B1 | 7/2001 | Strentzsch et al. |
| 6,256,739 B1 | 7/2001 | Skopp et al. |
| 6,259,771 B1 | 7/2001 | Kredo et al. |
| 6,259,972 B1 | 7/2001 | Sumic et al. |
| 6,269,361 B1 | 7/2001 | Davis et al. |
| 6,282,511 B1 | 8/2001 | Mayer |
| 6,292,172 B1 | 9/2001 | Makhlouf |
| 6,292,709 B1 | 9/2001 | Uhl et al. |
| 6,297,819 B1 | 10/2001 | Furst |
| 6,298,327 B1 | 10/2001 | Hunter et al. |
| 6,298,341 B1 | 10/2001 | Mann et al. |
| 6,298,352 B1 | 10/2001 | Kannan et al. |
| 6,311,214 B1 | 10/2001 | Rhoads |
| 6,314,469 B1 | 11/2001 | Tan et al. |
| 6,321,222 B1 | 11/2001 | Soderstrom et al. |
| 6,321,242 B1 | 11/2001 | Fogg et al. |
| 6,324,538 B1 | 11/2001 | Wesinger, Jr. et al. |
| 6,324,585 B1 | 11/2001 | Zhang et al. |
| 6,324,650 B1 | 11/2001 | Ogilvie |
| 6,332,141 B2 | 12/2001 | Gonzalez et al. |
| 6,332,158 B1 | 12/2001 | Risley et al. |
| 6,338,082 B1 | 1/2002 | Schneider |
| 6,339,767 B1 | 1/2002 | Rivette et al. |
| 6,339,786 B1 | 1/2002 | Ueda et al. |
| 6,356,422 B1 | 3/2002 | Bilac et al. |
| 6,356,898 B2 | 3/2002 | Cohen et al. |
| 6,360,256 B1 | 3/2002 | Lim |
| 6,363,433 B1 | 3/2002 | Nakajima |
| 6,366,298 B1 | 4/2002 | Haitsuka et al. |
| 6,366,906 B1 | 4/2002 | Hoffman |
| 6,381,627 B1 | 4/2002 | Kwan et al. |
| 6,381,651 B1 | 4/2002 | Nishio et al. |
| 6,385,620 B1 | 5/2002 | Kurzius et al. |
| 6,389,462 B1 | 5/2002 | Cohen et al. |
| 6,393,117 B1 | 5/2002 | Trell |
| 6,401,118 B1 | 6/2002 | Thomas |
| 6,405,243 B1 | 6/2002 | Nielsen |
| 6,412,014 B1 | 6/2002 | Ryan |
| 6,421,675 B1 | 7/2002 | Ryan et al. |
| 6,427,164 B1 | 7/2002 | Reilly |
| 6,430,623 B1 | 8/2002 | Alkhatib |
| 6,434,547 B1 | 8/2002 | Mishelevich et al. |
| 6,438,583 B1 | 8/2002 | McDowell et al. |
| 6,442,549 B1 | 8/2002 | Schneider |
| 6,442,602 B1 | 8/2002 | Choudhry |
| 6,449,657 B2 | 9/2002 | Stanbach, Jr. et al. |
| 6,452,609 B1 | 9/2002 | Katinsky et al. |
| 6,496,981 B1 | 12/2002 | Wistendahl et al. |
| 6,502,131 B1 | 12/2002 | Vaid et al. |
| 6,502,132 B1 | 12/2002 | Kumano et al. |
| 6,505,201 B1 | 1/2003 | Haitsuka et al. |
| 6,509,833 B2 | 1/2003 | Tate |
| 6,510,461 B1 | 1/2003 | Nielsen |
| 6,513,060 B1 | 1/2003 | Nixon et al. |
| 6,519,589 B2 | 2/2003 | Mann et al. |
| 6,526,402 B2 | 2/2003 | Ling |
| 6,532,366 B1 | 3/2003 | Chung et al. |
| 6,549,892 B1 | 4/2003 | Sansone |
| 6,556,992 B1 | 4/2003 | Barney et al. |
| 6,560,634 B1 | 5/2003 | Broadhurst |
| 6,574,737 B1 | 6/2003 | Kingsford et al. |
| 6,578,078 B1 | 6/2003 | Smith et al. |
| 6,591,291 B1 | 7/2003 | Gabber et al. |
| 6,594,697 B1 | 7/2003 | Praitis et al. |
| 6,603,844 B1 | 8/2003 | Chavez, Jr. et al. |
| 6,604,132 B1 | 8/2003 | Hitt |
| 6,605,120 B1 | 8/2003 | Fields et al. |
| 6,606,659 B1 | 8/2003 | Hegli et al. |
| 6,608,891 B1 | 8/2003 | Pelletier et al. |
| 6,611,803 B1 | 8/2003 | Furuyama et al. |
| 6,615,237 B1 | 9/2003 | Kyne et al. |
| 6,615,247 B1 | 9/2003 | Murphy |
| 6,615,348 B1 | 9/2003 | Gibbs |
| 6,618,697 B1 | 9/2003 | Kantrowitz et al. |
| 6,618,726 B1 | 9/2003 | Colbath et al. |
| 6,628,314 B1 | 9/2003 | Hoyle |
| 6,636,854 B2 | 10/2003 | Dutta et al. |
| 6,636,961 B1 | 10/2003 | Braun et al. |
| 6,637,032 B1 | 10/2003 | Feinleib |
| 6,650,877 B1 | 11/2003 | Tarbouriech et al. |
| 6,654,741 B1 | 11/2003 | Cohen et al. |
| 6,654,746 B1 | 11/2003 | Wong et al. |
| 6,654,779 B1 | 11/2003 | Tsuei |
| 6,665,620 B1 | 12/2003 | Burns et al. |
| 6,668,278 B1 | 12/2003 | Yen et al. |
| 6,671,585 B2 | 12/2003 | Lof et al. |
| 6,671,714 B1 | 12/2003 | Weyer et al. |
| 6,671,738 B1 | 12/2003 | Rajchel et al. |
| 6,674,993 B1 | 1/2004 | Tarbouriech |
| 6,678,717 B1 | 1/2004 | Schneider |
| 6,691,105 B1 | 2/2004 | Virdy |
| 6,711,585 B1 | 3/2004 | Copperman et al. |
| 6,718,321 B2 | 4/2004 | Birrell et al. |
| 6,735,585 B1 | 5/2004 | Black et al. |
| 6,745,367 B1 | 6/2004 | Bates et al. |
| 6,748,375 B1 | 6/2004 | Wong et al. |
| 6,751,562 B1 | 6/2004 | Blackett et al. |
| 6,751,606 B1 | 6/2004 | Fries et al. |
| 6,760,746 B1 | 7/2004 | Schneider |
| 6,760,770 B1 | 7/2004 | Kageyama |
| 6,766,369 B1 | 7/2004 | Haitsuka et al. |
| 6,779,178 B1 | 8/2004 | Lloyd et al. |
| 6,799,201 B1 | 9/2004 | Lee et al. |
| 6,836,805 B1 | 12/2004 | Cook |
| 6,850,940 B2 | 2/2005 | Wesinger, Jr. et al. |
| 6,880,007 B1 | 4/2005 | Gardos et al. |
| 6,892,226 B1 | 5/2005 | Tso et al. |
| 6,895,402 B1 | 5/2005 | Emens et al. |
| 6,895,430 B1 | 5/2005 | Schneider |
| 6,901,436 B1 | 5/2005 | Schneider |
| 6,931,451 B1 | 8/2005 | Logan et al. |
| 6,944,658 B1 | 9/2005 | Schneider |
| 6,959,339 B1 | 10/2005 | Wu et al. |
| 6,961,700 B2 | 11/2005 | Mitchell et al. |
| 6,963,928 B1 | 11/2005 | Bagley et al. |
| 6,973,505 B1 | 12/2005 | Schneider |
| 6,981,023 B1 | 12/2005 | Hamilton et al. |
| 6,990,678 B2 | 1/2006 | Zigmond |
| 7,000,028 B1 | 2/2006 | Broadhurst et al. |
| 7,003,442 B1 | 2/2006 | Tsuda |
| 7,003,719 B1 * | 2/2006 | Rosenoff et al. .............. 715/205 |
| 7,010,568 B1 | 3/2006 | Schneider et al. |
| 7,013,298 B1 | 3/2006 | De La Huerga |
| 7,039,697 B2 | 5/2006 | Bayles |
| 7,039,708 B1 | 5/2006 | Knobl et al. |
| 7,069,323 B1 | 6/2006 | Gardos et al. |
| 7,080,158 B1 | 7/2006 | Squire |
| 7,089,194 B1 | 8/2006 | Berstis et al. |
| 7,120,236 B1 | 10/2006 | Schneider |
| 7,136,725 B1 | 11/2006 | Paciorek et al. |
| 7,136,932 B1 | 11/2006 | Schneider |
| 7,149,780 B2 | 12/2006 | Quine et al. |
| 7,188,138 B1 | 3/2007 | Schneider |
| 7,194,552 B1 | 3/2007 | Schneider |
| 7,225,249 B1 | 5/2007 | Barry et al. |
| 7,359,987 B2 | 4/2008 | Stahura |
| 7,418,471 B2 | 8/2008 | King et al. |
| 7,472,160 B2 | 12/2008 | King et al. |

| | | | |
|---|---|---|---|
| 7,490,124 B2 | 2/2009 | King et al. | |
| 7,543,026 B2 | 6/2009 | Quine et al. | |
| 7,546,381 B2 | 6/2009 | Tout | |
| 7,565,402 B2 | 7/2009 | Schneider | |
| 7,606,858 B2 | 10/2009 | King et al. | |
| 7,627,628 B2 | 12/2009 | King et al. | |
| 7,752,260 B2 | 7/2010 | King et al. | |
| 8,037,168 B2 | 10/2011 | Schneider | |
| 2001/0010032 A1 | 7/2001 | Ehlers et al. | |
| 2001/0021947 A1 | 9/2001 | Kim | |
| 2001/0047429 A1 | 11/2001 | Seng et al. | |
| 2002/0010795 A1 | 1/2002 | Brown | |
| 2002/0016174 A1 | 2/2002 | Gibson et al. | |
| 2002/0023034 A1 | 2/2002 | Brown et al. | |
| 2002/0024424 A1 | 2/2002 | Burns et al. | |
| 2002/0059161 A1 | 5/2002 | Li | |
| 2002/0065903 A1 | 5/2002 | Fellman | |
| 2002/0069080 A1 | 6/2002 | Roy et al. | |
| 2002/0069378 A1 | 6/2002 | McLellan et al. | |
| 2002/0073233 A1 | 6/2002 | Gross et al. | |
| 2002/0091703 A1 | 7/2002 | Bayles | |
| 2002/0091827 A1 | 7/2002 | King et al. | |
| 2002/0091836 A1 | 7/2002 | Moetteli | |
| 2002/0103745 A1 | 8/2002 | Lof et al. | |
| 2002/0129013 A1 | 9/2002 | Thomas | |
| 2002/0156800 A1 | 10/2002 | Ong | |
| 2002/0188699 A1 | 12/2002 | Ullman et al. | |
| 2002/0194113 A1 | 12/2002 | Lof et al. | |
| 2003/0009592 A1 | 1/2003 | Stahura | |
| 2003/0014450 A1 | 1/2003 | Hoffman | |
| 2003/0074672 A1 | 4/2003 | Daniels | |
| 2003/0088708 A1 | 5/2003 | Lewallen | |
| 2003/0098375 A1 | 5/2003 | Shiga et al. | |
| 2003/0225670 A1 | 12/2003 | DeCarlo, III | |
| 2004/0030759 A1 | 2/2004 | Hidary et al. | |
| 2004/0044791 A1 | 3/2004 | Pouzzner | |
| 2004/0088083 A1 | 5/2004 | Davis et al. | |
| 2004/0107025 A1 | 6/2004 | Ransom et al. | |
| 2005/0055306 A1 | 3/2005 | Miller et al. | |
| 2005/0102354 A1 | 5/2005 | Hollenbeck et al. | |
| 2005/0235031 A1 | 10/2005 | Schneider | |
| 2006/0190623 A1 | 8/2006 | Stahura | |
| 2006/0265516 A1 | 11/2006 | Schilling | |
| 2008/0005342 A1 | 1/2008 | Schneider | |
| 2008/0010365 A1 | 1/2008 | Schneider | |
| 2008/0016142 A1 | 1/2008 | Schneider | |
| 2008/0016233 A1 | 1/2008 | Schneider | |
| 2008/0059607 A1 | 3/2008 | Schneider | |
| 2008/0235383 A1 | 9/2008 | Schneider | |

FOREIGN PATENT DOCUMENTS

| | | |
|---|---|---|
| JP | 11085492 | 3/1999 |
| JP | 11184667 | 7/1999 |
| JP | 11242682 | 9/1999 |
| JP | 11296428 | 10/1999 |
| WO | 9909726 | 2/1999 |
| WO | 9939275 | 8/1999 |
| WO | 0007133 | 2/2000 |

OTHER PUBLICATIONS

Berners-Lee, T. et al., Uniform Resource Identifiers (URI): General Syntax; Network Working Group, Aug. 1988.

Berners-Lee, T.; Universal Resource Identifiers in WWW-A Unifying Syntax for the Expression of Names and Addresses of Objects on the Network as used in the World Wide Web; Network Working Group, Request for Comments 1630; IETF, 6-94; http:--www.faqs.org-rfcs-rfc1630.html.

Blackout early warnings mandated; American City Business Journals, Apr. 3, 2001; USA; paragraphs 1, 2, 5, 6.

Bradley, J.; ISO Blackout Notice Plan Follow-Up; Silicon Valley Manufacturers Group & California Independent System Operator (CAISO); May 8, 2001; p. 1, paragraphs 1, 2, 3, 4; p. 2, paragraphs 1, 3, 4.

Cabell, D., Name Conflicts; Learning Cyberlaw in Cyberspace; Berkman Center for Internet & Society, Harvard Law Schol, Aug. 25, 1999, pp. 1-21.

CAISO Summer 2001 Assessment; California Independent System Operator (CAISO); Mar. 22, 2001; USA; p. 29, paragraphs 1 & 2, p. 30, paragraphs 1, 2, Figure III-E.

California Independent System Operator Load Program Participants; California Independent System Operator (CAISO); Apr. 8, 2002; pp. 1, 2, 3.

California Independent System Operator Participant's whom have entered into an Interruptible Service Contract or similar agreement; California Independent System Operator (CAISO); Dec. 10, 2002; p. 1.

Consolidated List of Recommendations; National Transmission Grid Study; United States of America Federal Energy Regulation Commision; FERC; May 6, 2002, USA; pp. 2-76 & 3-77 Section 4, 5-79 Section 5.

Cooper, A et al; The US Domain; Network Working Group, Request for Comments: 1480, Jun. 1993; pp. 1-47.

Courter, Gini; Microsoft Office 2000 Professional Edition, 1999, Sybex, pp. 92-96, 254-257.

Crow, R., the Telephone Exchange Name Project, Web Site (1998), from http:--ourwebhome.com-TENP-TENproject.html.

Cumulative Totals of No-Touch, Restricted Maintenance Operations, Alert, Warning, Emergency and Power Watch Notices Issued from 1998 to Present; California Independent System Operator (CAISO); May 29, 2003; p. 4, Table; p. 5, Table; p. 6, Table; p. 7, Table; p. 8, Table; p. 9, Table; p. 10, Table; p. 11, Table; p. 11, Table; p. 12, Table; p. 14, Table.

Deep Space Web?, Wired News Report, Jul. 22, 1999, from http://www.wired.com-news-technology-0,1282,139-09,00.html.

Desmond, J.; Customer Centric Alert and Response Program Overview; California Independent System Operator (CAISO); May 24, 2001; USA; pp. 2, 3, 4, 5, 6, 12, 13, 17, 18.

Donaghy, Melanie, 'Net' gains and losses. Wines & Vines. vol. 78, No. 9, Sep. 1997, p. 39(6).

Energy Action Plan; State of California; May 20, 2003; USA; p. 5, Section 1; pp. 7 & 8 Section V.

FAX-Phone Switch for Multi-Ring Telephone Lines; Derwent Abstract; Jul. 1992.

Goldman, C.A.; Kintner-Meyer, M.; Heffner, G.; Do "Enabling Technologies" Affect Customer Performance in Price-Responsive Load Programs?; LBNL-50328; Ernest Orlando Lawrence Berkeley National Laboratory; http:--eetd.lbl.gov-EA-EMP-; Aug. 2002; p. 3, paragraph 2; p. 4, paragraph 2; p. 6, paragraph 3; p. 7, paragraphs 1 & 2, Table 2; p. 8, paragraphs 1, 2, 3, Table 3; p. 9, paragraphs 1, 2, 3, Table 4; p. 10, paragraphs 1, 2, 3; p. 11, paragraph 1, Table 5; p. 12, paragraphs 1 & 2, Figure 2; p. 15, paragraphs 2, 3, 4; p. 16, paragraph 2.

Goodin, D., CNET News.com: NSI confirms database revisions, Jan. 21, 1999, pp. 1-2.

Goodin, D., CNET News.com: NSI domain slowdown persists, Jan. 1999, pp. 1-4.

Graves, K.; CAISO Feb. 2001 Winter Assessment and Summer 2001 Post-season Summary; California Independent System Operator (CAISO); Oct. 8, 2001; USA; pp. 17 & 18, Section IV.

Gross, G.; FCC moves ahead with powerline broadband rules; IDG News Service; Feb. 13, 2004; USA; paragraphs 1, 2, 6, 9.

Harrenstien, et al.; RFC 954: Nicname-Whois, IETF, Oct. 1985, http:--ww.faqs.org-rfcs-rfc954.html.

Helman, C., For years electric companies have dreamed of making their wires the high-speed data pipe to your PC. One tech company may yet make the dream possible.; Forbes.com; Jan. 20, 2003; USA; paragraphs 1, 2, 3, 4, 5.

Hollenbeck et al., Domain Name System Wildcards in Top-Level Domain Zones, VeriSign Naming and Directory Services, VeriSign, Inc., Sep. 9, 2003.

IEA—experts group on r&d priority setting and evaluation liberalisation of the electricity market, Osterreichische Gesellschaft fur Umwelt und Technik. Mar. 18, 2002; Austria (in English); pp. 4 (sections 3 and 4), 7 (section 3), 8 (Controllable "Dispatchable" Loads, section 2), 9 (Distributed Energy Resources).

Implementation Plan and Required Information for the Partipating Load Program (PLP); California Independent System Operator (CAISO); Aug. 8, 2002; USA; p. 1, paragraphs 2 & 3; p. 2, paragraphs 1 & 2, Table 1.

Improvement of Technical Management of Internet Names and Addresses; NTIA-DOC, Federal Register V63 N34, Feb. 2, 1998, from http:--www.ntia.doc.gov-ntiahome-domainname-022098fedreg.htm.

Incremental Zone Transfer in DNS; OHTA; RFC 1995, Aug. 1996.

Jonker, R et al, "Enabling Distributed Generation and Demand Response with Enterprise Energy-Management Systems" Darnell. com Power Pulse.; May 17, 2001; USA; p. 1, paragraphs 1 & 2; p. 2, paragarphs 1, 2, 3, 4, 5, 6, 7, 8; p. 5, paragraphs 2, 3, 4, 5, 6; p. 7, paragraphs 4, 6, 7, 8, 9; p. 8, paragraphs 2, 3, 4; p. 9; p. 10.

Labaton, S., F.C.C. Begins Rewriting Rules on Delivery of the Internet; Associated Press; Feb. 13, 2004; USA; paragarphs 1, 2, 6, 7.

Liberto, S.M., Domain Name Conflicts: Hey! That s My.Com!, WWWiz Magazine, 3-98, pp. 1-3.

Load Management; Advanced Control Systems, Inc.; Jun. 20, 2001 (Aug. 1999); USA; p. 1, paragraph 1; p. 2, paragraphs 1, 2, 3; p. 3, paragraphs 1 & 2; p. 4, paragraphs 1 & 2.

Mockapetris P., RFC 1035: Domain Names-Implementation and Specification , IETF, Nov. 1987, http://www.faqs.org-rfcs-rfc1035. html.

Mockapetris, Domain Names-Concepts and Facilities , RFC 1034, Nov. 1987.

Motegi, N., Piette, MA.; Web-based Energy Information Systems for Large Commercial Buildings; Ernest Orlando Lawrence Berkely National Laboratory; May 2002; USA; p. 3, paragraphs 1, 2, 4, Figure 1; p. 4, paragraphs 1, 2, 3, 4; p. 7, paragraphs 2, 3, 4, Table 1; 10, paragraph 2; p. 11, paragraph 1, Table 5.

Network Solutions and Leading Launch Premier Domain Registration Service Program, Mar. 1997.

Network Solutions and VeriSign Launch Combined Internet Name and Certification Registration, Internet World. Mar. 10, 1997.

Network Solutions Home Page; Nov. 11, 1999; from http://www.networksolutions.com.

Northrup, Tony; "Domain Name Services"; NT Network Plumbing: Routers, Proxies, and Web Services; 1998; pp. 99-141; IDG Books Worldwide, Inc.; Foster City, Califorrnia.

Notification Plan (2); Board of Governors, California Independent System Operator (CAISO); May 21, 2001.

Oakes, C., Internet Keywords Patent Spat, Wired News, Jul. 22, 1999 from http:--www.wired.com-news-technology-0,1282,13892.00html.

Oakes, Chris, "Net Sol, ICANN Reach Accord," Wired News, from wired.com-news-politics-0,1283,31557,00.html, Sep. 29, 1999, pp. 1-3.

OINGO Pioneers New Domain Name Variation Technology, Los Anglees: Internet World, May 17, 2000; http://www.namingsolutions.com-ns_new_pr_51700.hmtl.

Perez, Juan-Carlos, Mozilla Launches Firefox 1.0, PCWORLD.com, Nov. 9, 2004 <http:--www.pcworld.com-news-article-0,aid,118537,00.asp>.

Perez-Pena, R.; Utility Could Have Halted '03 Blackout, Panel Says; New York Times; http://www.nytimes.com-2004-0406-national-06BLAC.html; Apr. 6, 2004; paragraphs 1, 2, 3, 4, 9.

Purdum, T.; Statewide Blackouts Ordered as Heat Strains California Grid; New York Times; May 8, 2001; paragraphs 3, 4, 5, 8, 9.

Request for Comments on the enhancement of the .us Domain Space; National Telecommunications and Information Administration, Commerce; NTIA-DOC, Aug. 4, 1998, from http://www.ntia.doc.gov-ntiahome-domainname-usrfc-dotusrfc.htm.

Samson, M., PGMedia, Inc. d-b-a Name.Space TM, v. Network Solutions, Inc., et al., Mar. 1999, pp. 1-2.

Schmid, E. Electric Emergency Notification; California Independent System Operator (CAISO), May 24, 2001; USA; pp. 3-10, 12-20.

Schmid, E., McCorkle, S., O'Neil, E.; ISO Electric Emergency Notification: Memorandum; California Independent System Operator (CAISO); May 17, 2001; USA; p. 1, paragraphs 1 & 4; p. 2, paragraphs 1, 2, 3; p. 3; pg. 4, paragraph 4 & 5; p. 5; p. 6, paragraph 1, p. 7; p. 8.

Singhal, Vigyan et al, "Analysis of locking behavior in three real database systems," The VLDB Journal, vol. 6, 1997. pp. 40-52.

Sollins, K; Architecture Principles of Uniform Resource Name Resolution, Network Working Group Request for Comments 2276; Jan. 1998; pp. 1-24.

Southern Telecom and Main.net Announce Successful Demonstration of Broadband over Power Lines; Southern Telecom; Dec. 2003; p. 1.

The Development of Electric System Emergencies and the Emergency Response Communication Network: White Paper; California Independent System Operator (CAISO); Jun. 20, 2001; USA; p. 2, paragraphs 1 & 4; p. 3, paragraph 1 & Section II; pp. 6, 7, 8, 9; p. 10, Section III, paragraphs 1, 2, 3; p. 11, paragraphs 2 & 3; p. 12, paragraph 1; p. 13, paragraph 4, p. 14.

The Economic Structure of Internet Generic Top-Level Domain Name Registries Analysis and Recommendations; Statement of the Policy Oversight Committee; Jul. 23, 1998.

The Postal Proposal, Wired News Report. May 8, 1999; from http:www.wired.com.

Vixie et al., Dynamic Updates in the Domain Name System (DNS Update) , RFC 2136, Apr. 1997.

Weiss, J.; EPRI's Enterprise Infrastructure Security (EIS) Program ; Jul. 7, 2000; USA; pp. 2 through 24.

Weller, G.H.; A Case Study Review of Technical and Technology Issues for Transition of a Utility Load Management Program to Provide System Reliability Resources in Restructured Electricity Markets; LBNL-52408; Ernest Orlando Lawrence Berkeley National Laboratory; http:--certs.lbl.gov-; Jul. 2001; USA; pp. 1 & 2, Section 1; pp. 3 & 4, Section 2; pp. 6-13, Sections 3.1-3.1.8; pp. 16-17, Section 3.3, Table 3.1; pp. 18-40, Section 4; pp. 41-42, Section 5; Appendix A.

Werst, K.L., Why Rotating Outages?; California Independent System Operator (CAISO); Aug. 17, 2001; USA; paragraphs 1, 2, 3, 5, 6, 7.

What does your phone Number spell?. Home page of www.phonespell.com; Wayback Machine, 1996.

What Words are Hiding in Your Phone Number? Home page of www.dialABC.com; Wayback Machine, 1999.

www.phonetic.com; Internet print-out; Wayback Machine, Dec. 11, 1997.

\* cited by examiner

Results for "software patent"
1 - 4 next >>

1. SoftwarePatent.com : Software Patent Resources.
SoftwarePatent.com provides resources and links for: patent searching, laws, case, intellectual property organizations. All links are software, internet and computer patent related
99% 9/16/99 http://www.softwarepatent.com/

2. Software Patent Resource has moved to http://www.softwarepatent.com
Software Patent Resource has moved to http://www.softwarepatent.com
98% 9/15/99 http://www.longest.com/spn/spn.shtml 3. Patent Explorer / Software Subset
Rapid Patent, in association with Electronic Data Systems (EDS), has developed a single CD-ROM which holds all previously inaccessible software patent data. There are over 7,000 software patents covering 20 years from 1972. Full text searchable
98% 9/4/99 http://law.cd-rom-directory.com/cdprod1/cdhrec/002/509.shtml 4. Recent Software Patent Developments In The United States
Recent Software Patent Developments In The United States John V. Swinson* Abstract This article examines recent U.S. developments in patent law concerning computer software. The cases discussed are appellate decisions of the Court of Appeals..
98% 9/24/99 http://www.comlaw.utas.edu.au/law/jlis/patents.html

*Prior Art*
*Fig. 6a*

Results for "software patent"
1 - 4 next >>

1. SoftwarePatent.com : Software Patent Resources.
WHOIS
SoftwarePatent.com provides resources and links for: patent searching, laws, case, intellectual property organizations. All links are software, internet and computer patent related
99%  9/16/99  http://www.softwarepatent.com/

2. Software Patent Resource has moved to http://www.softwarepatent.com
WHOIS    Homepage
Software Patent Resource has moved to http://www.softwarepatent.com
98%  9/15/99  http://www.longest.com/spn/spn.shtml 3. Patent Explorer / Software Subset
WHOIS    Homepage    Page Source
Rapid Patent, in association with Electronic Data Systems (EDS), has developed a single CD-ROM which holds all previously inaccessible software patent data. There are over 7,000 software patents covering 20 years from 1972. Full text searchable
98%  9/4/99  http://law.cd-rom-directory.com/cdprod1/cdhrec/002/509.shtml 4. Recent Software Patent Developments In The United States
WHOIS    Homepage    Page Source    Meta    Sitemap    After Market Status
Recent Software Patent Developments In The United States John V. Swinson* Abstract This article examines recent U.S. developments in patent law concerning computer software. The cases discussed are appellate decisions of the Court of Appeals..
98%  9/24/99  http://www.comlaw.utas.edu.au/law/jlis/patents.html

*Fig. 6b*

```
<html><body>
Results for "software patent"<br>
1 - 4 next >><p>
<a href="http://www.softwarepatent.com">
1. SoftwarePatent.com : Software Patent Resources.</a><br>
<a href="http://www.networksolutions.com/cgi-bin/whois/whois?softwarepatent.com">
WHOIS</a><br>
SoftwarePatent.com provides resources and links for: patent searching, laws, case,<br>
intellectual property organizations. All links are software, internet and computer patent related<br>
99%  9/16/99 http://www.softwarepatent.com<p>
<a href="http://www.longest.com/spn/spn.shtml">
2. Software Patent Resource has moved to http://www.softwarepatent.com</a><br>
<a href="http://www.networksolutions.com/cgi-bin/whois/whois?longest.com">
WHOIS</a>   
<a href="http://www.longest.com">Homepage</a><br>
Software Patent Resource has moved to http://www.softwarepatent.com<br>
98%  9/15/99 http://www.longest.com/spn/spn.shtml<p> et cetera....

</body></html>
```

*Fig. 6c*

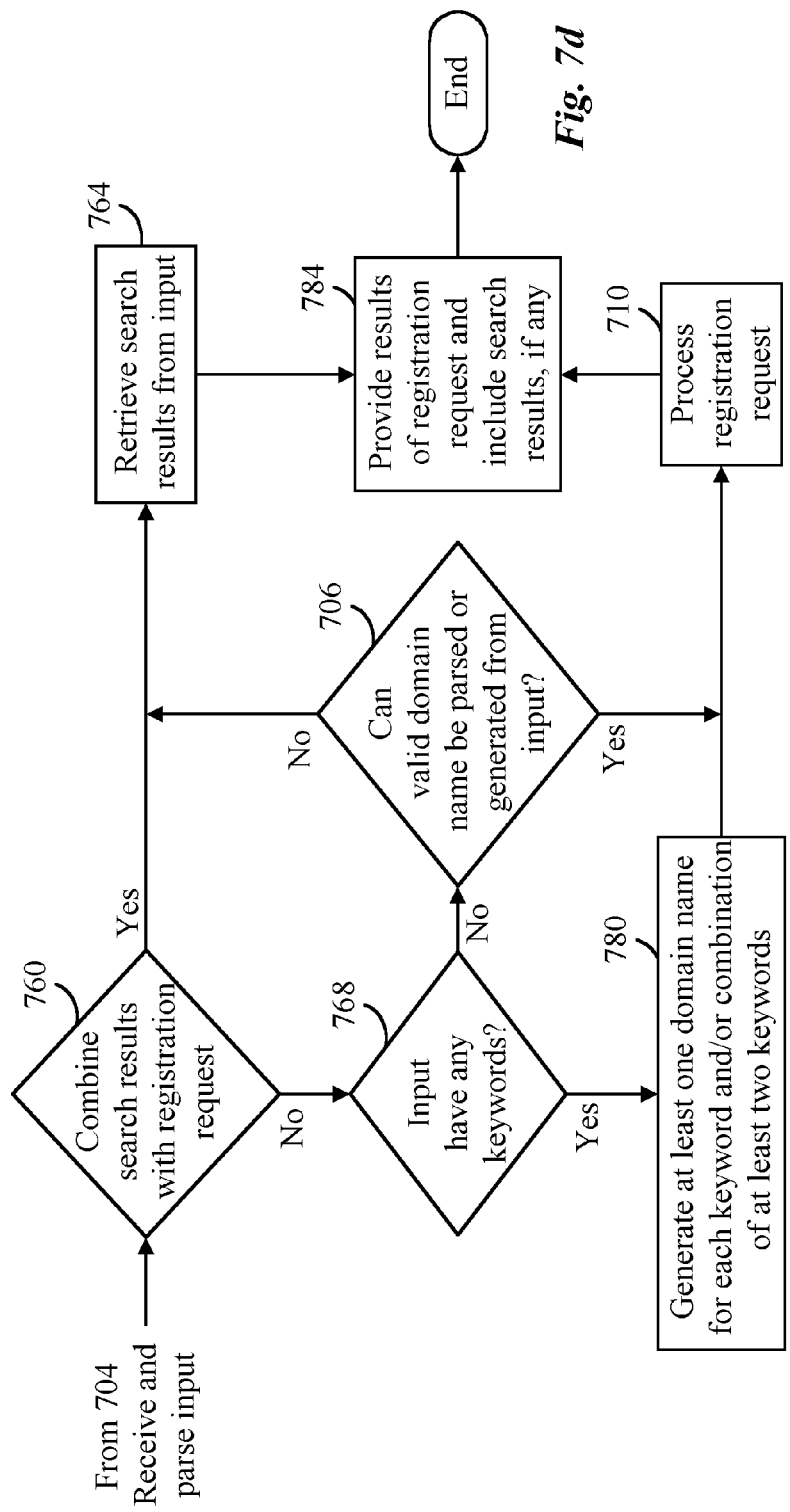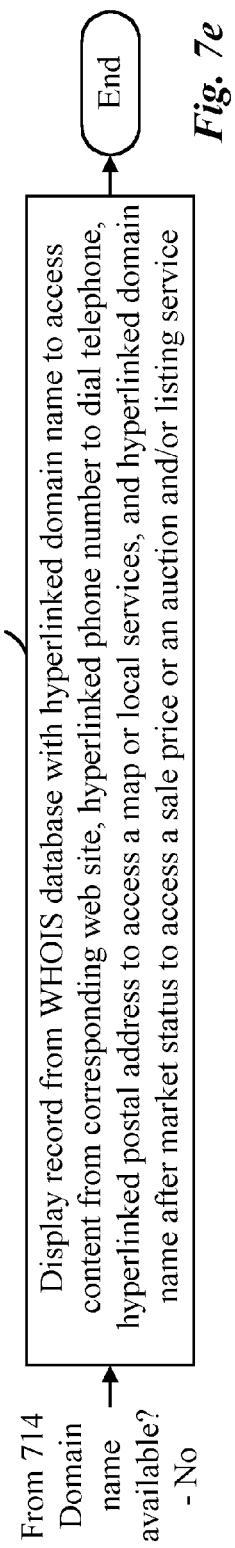

Registrant:
Internet Assigned Numbers Authority (EXAMPLE-DOM)
  4676 Admiralty Way, Suite 330
  Marina del Rey, CA 90292
  US Domain Name: EXAMPLE.COM Administrative Contact, Technical Contact, Zone Contact:
   Internet Assigned Numbers Authority (ANA)  iana@IANA.ORG
       310-823-9358
   Fax- - 310-823-8649

Record last updated on 14-Jun-99.
Record expires on 15-Aug-2000.
Record created on 14-Aug-95.
Database last updated on 18-Jun-2000 16:11:15 EDT.

Domain servers in listed order:

| | |
|---|---|
| VENERA.ISI.EDU | 128.9.176.32 |
| NS.ISI.EDU | 128.9.128.127 |

*Prior Art*
*Fig. 7f*

```
<html><body>
<pre>
Registrant:
Internet Assigned Numbers Authority (<A href="whois?EXAMPLE-DOM">EXAMPLE-DOM</A>)
4676 Admiralty Way, Suite 330                    794
Marina del Rey, CA <a href="/cgi-bin/map.cgi?zip=90292">90292</a>
US
                                                              792
Domain Name: <a href="http://www.example.com">EXAMPLE.COM</a>

Administrative Contact, Technical Contact, Zone Contact:
    Internet Assigned Numbers Authority  (<A href="whois?IANA">IANA</A>)  iana@IANA.ORG
    <a href="tel:+13108239358">310-823-9358</a>    796
    <a href="fax:+13108238649">Fax- 310-823-8649</a>

Record last updated on 14-Jun-99.
Record created on 14-Aug-95.
Database last updated on 11-Aug-99 03:52:52 EDT.

Domain servers in listed order:

VENERA.ISI.EDU          <A href="whois?128.9.176.32">128.9.176.32</A>
NS.ISI.EDU              <A href="whois?128.9.128.127">128.9.128.127</A>
                                                                          798
</pre>
<a href="http://tlda.com/cgi-bin/marketstatus.cgi?dn=example.com">Domain Name After Market Status</A>
</body></html>
```

*Fig. 7g*

METHOD, PRODUCT, AND APPARATUS FOR ENHANCING RESOLUTION SERVICES, REGISTRATION SERVICES, AND SEARCH SERVICES

CROSS-REFERENCE TO RELATED APPLICATIONS

This application is a divisional of U.S. patent application Ser. No. 10/904,943, filed Dec. 6, 2004, which is hereby incorporated by reference and which is a divisional application of U.S. patent application Ser. No. 09/598,134, filed Jun. 21, 2000, now U.S. Pat. No. 6,895,430, which is hereby incorporated by reference and which is a continuation in part of U.S. patent application Ser. No. 09/532,500, filed Mar. 21, 2000, by Schneider, now U.S. Pat. No. 7,136,932, which is hereby incorporated by reference, and U.S. patent application Ser. No. 09/598,134 is a continuation in part of U.S. patent application Ser. No. 09/525,350, filed Mar. 15, 2000, by Schneider, now U.S. Pat. No. 6,338,082, which is hereby incorporated by reference, and U.S. patent application Ser. No. 09/532,500 claims the benefit of the following, which are hereby incorporated by reference: U.S. Provisional Application Ser. No. 60/160,125, filed Oct. 18, 1999, now expired, U.S. Provisional Application Ser. No. 60/157,075, filed Oct. 1, 1999, now expired, U.S. Provisional Application Ser. No. 60/143,859, filed Jul. 15, 1999, now expired, U.S. Provisional Application Ser. No. 60/125,531, filed Mar. 22, 1999, now expired, U.S. Provisional Application Ser. No. 60/130,136, filed Apr. 20, 1999, now expired, U.S. Provisional Application Ser. No. 60/175,825, filed Jan. 13, 2000, now expired, and U.S. Provisional Application Ser. No. 60/135, 751, filed May 25, 1999, now expired, wherein each of the above listed applications are incorporated by reference herein.

FIELD

This invention generally relates to information services, and more specifically relates to a method, product, and apparatus for integrating and enhancing resolution services, registration services, and search services.

BACKGROUND

The Internet is a vast computer network consisting of many smaller networks that span the world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may issue the data and a client computer displays or processes it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

Client side browsers, such as Netscape Navigator and/or Microsoft Internet Explorer (MSIE) provide a graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side browser reads these codes in order to display the page. A web page may be static and requires no variables to display information or link to other predetermined web pages. A web page is dynamic when arguments are passed which are either hidden in the web page or entered from a client browser to supply the necessary inputs displayed on the web page. Common Gateway Interface (CGI) is a standard for running external programs from a web server. CGI specifies how to pass arguments to the executing program as part of the HTTP server request. Commonly, a CGI script may take the name and value arguments from an input form of a first web page which is be used as a query to access a database server and generate an HTML web page with customized data results as output that is passed back to the client browser for display.

The Web is a means of accessing information on the Internet that allows a user to "surf the web" and navigate the Internet resources intuitively, without technical knowledge. The Web dispenses with command-line utilities, which typically require a user to transmit sets of commands to communicate with an Internet server. Instead, the Web is made up of millions of interconnected web pages, or documents, which may be displayed on a computer monitor. The Web pages are provided by hosts running special servers. Software that runs these Web servers is relatively simple and is available on a wide range of computer platforms including PC's. Equally available is a form of client software, known as a Web browser, which is used to display Web pages as well as traditional non-Web files on the client system.

A network resource identifier such as a Uniform Resource Identifier (URI) is a compact string of characters for identifying an abstract or physical resource. URIs are the generic set of all names and addresses that refer to objects on the Internet. URIs that refer to objects accessed with existing protocols are known as Uniform Resource Locators (URLs). A URL is the address of a file accessible on the Internet. The URL contains the name of the protocol required to access the resource, a domain name, or IP address that identifies a specific computer on the Internet, and a hierarchical description of a file location on the computer. For example the URL "http://www.example.com/index.html", where "http" is the scheme or protocol, "www.example.com" is the Fully Qualified Domain Name (FQDN), and "index.html" is the filename located on the server.

Because an Internet address is a relatively long string of numbers (e.g., 31.41.59.26) that is difficult to remember, Internet users rely on domain names, memorable and sometimes catchy words corresponding to these numbers, in order to use electronic mail (e-mail) and to connect to Internet sites on the Web. The Domain Name System (DNS) is a set of protocols and services on a network that allows users to utilize domain names when looking for other hosts (e.g., computers) on the network. The DNS is composed of a distributed database of names. The names in the DNS database establish a logical tree structure called the domain name space. Each node or domain in the domain name space is named and may contain subdomains. Domains and subdomains are grouped into zones to allow for distributed administration of the name space.

The DNS provides a mechanism so backup databases may be identified in case the first one becomes unavailable. DNS databases are updated automatically so that information on one name server does not remain out-of-date for long. A client of the DNS is called a resolver; resolvers are typically located in the application layer of the networking software of each TCP/IP capable machine. Users typically do not interact directly with the resolver. Resolvers query the DNS by directing queries at name servers, which contain parts of the distributed database that is accessed by using the DNS protocols to translate domain names into IP addresses needed for transmission of information across the network.

A domain name consists of two parts: a host and a domain. Technically, the letters to the right of the "dot" (e.g., gen-eric.com) are referred to as Top Level Domains (TLDs), while hosts, computers with assigned IP addresses that are listed in specific TLD registries are known as second-level domains (SLDs). For the domain name "gen-eric.com", ".com" is the TLD, and "gen-eric" is the SLD. Domain name space is the ordered hierarchical set of all possible domain names either in use or to be used for locating an IP address on the Internet. TLDs are known as top-level domains because they comprise the highest-order name space available on the Internet. Second-level domains, as well as third-level domains (3LDs) such as "eric.gen-eric.com", are subsidiary to TLDs in the hierarchy of the Internet's DNS.

There are two types of top-level domains, generic and country code. Generic top-level domains (gTLDs) were created to allocate resources to the growing community of institutional networks, while country code top-level domains (ccTLDs) were created for use by each individual country, as deemed necessary. More than 240 national, or country-code TLDs (e.g., United States (.us), Japan (.jp), Germany (.de), etc.) are administered by their corresponding governments, or by private entities with the appropriate national government's acquiescence. A small set of gTLDs does not carry any national identifier, but denote the intended function of that portion of the domain space. For example, ".com" was established for commercial networks, ".org" for not-for-profit organizations, and ".net" for network gateways. The set of gTLDs was established early in the history of the DNS and has not been changed or augmented in recent years (COM, ORG, GOV, and MIL were created by January 1985, NET in July 1985, and INT was added in November 1988).

A growing set of tools and services have enabled users to choose many techniques suited for improved navigation and access to content on a network such as the Internet. Different services are used to access desired content. There are resolution services for the DNS which receives a domain name (e.g., "example.com) from a client for translation into an IP address to access the resources of a specific network addressable device (e.g., web server) on a network such as the Internet. The function of translating a domain name into a corresponding IP address is known as name resolution. Name resolution is performed by a distributed system of name servers that run specialized software known as resolvers to fulfill the resource location request of the client by the successive hierarchical querying of the resource records from zone files.

There are registration services such as the registration of domain names. Domain name registration for a given Network Information Center (NIC) authority may be accessed by a TCP/IP application called WHOIS, which queries a NIC database to find the name of network and system administrators, system and network points-of-contact, and other individuals who are registered in appropriate databases. Domain names are identifiers used for accessing resources and retrieving registrant domain name information. The availability of a domain name from a NIC authority for a given TLD is determined by submitting a WHOIS request. Resource location is determined by resolving a query in the DNS and domain name availability is determined by using a WHOIS service to query an appropriate NIC database.

There are search services to access searchable databases of network resources that are relied upon daily by millions of users. When a client system receives a search request, a query may be sent to a server connected to the Internet to retrieve Uniform Resource Locators (URLs) that satisfy the search request. Web page results are typically generated and displayed to the client in a batch of hyperlinks that access network resources.

In general, these areas remain as separate services and only a few examples may be demonstrated with respect to the integration of these separate areas. For instance, steps for integration of services have been demonstrated in U.S. Provisional Application Ser. No. 60/130,136 filed Apr. 20, 1999, by Schneider entitled "Method and system for integrating resource location and registration services", U.S. Provisional Application Ser. No. 60/160,125 filed Oct. 18, 1999, by Schneider, entitled "Method and system for integrating resource location, search services, and registration services", and U.S. patent application Ser. No. 09/525,350 filed Mar. 15, 2000, by Schneider, entitled "Method for integrating domain name registration with domain name resolution."

U.S. Pat. No. 5,778,367 issued on Jul. 7, 1998 by Wesinger Jr., et al., entitled, "Automated on-line information service and directory, particularly for the world wide web" provides a graphical front end to the WHOIS database, with additional hypertext link integration. Links are embedded in the results such that, clicking on a specific result, WHOIS is queried once again with respect to the selected information. This action would produce the same result as if the user had copied down the selected information, navigated to WHOIS and entered the selected information in the lookup field. The '367 patent automates the WHOIS tool with respect to itself and does not consider automating extended functions of resolution requests or search requests to access other network resources.

Due to domain name registration growth, it requires more labor to find a desirable domain name that is available. As a result companies such as Oingo, Inc., for example, now provide domain name variation services that help registrars increase domain name sales by identifying and suggesting words and phrases related in meaning to the terms sought to be registered. Other improvements to registration services include generating permutations of available domain names in response to supplying a plurality of keywords as a part of a registration request. Currently, the only way to register a domain name is by initiating a registration request. There are no services that combine the use of other requests (e.g., search request, resolution request, etc.) in response to an initiated registration request.

Resolution requests are most commonly generated in response to input provided to the location field of a web browser. The main use of a web browser location field is for resolving URLs to access resources. Entering a URL in the location field serves as a means to access that URL. Because the function of the location field is critical for accessing resources, the design of such location fields have rivaled much competition and innovation between existing web browser products from companies such as Netscape and Microsoft. Improvements to better track and organize sites of URLs that users have visited such as Bookmark folders, URL history, and the personal toolbar are all examples of functionality designed to help users navigate. Other improvements include spell checking and an autocomplete feature from the URL history as text is entered into the location field.

A more recent feature called Smart Browsing is integrated into Netscape Navigator that uses Internet Keywords so users may streamline the use of URLs and get fast access to web sites using the browser's location field. Any single or multi-word strings typed into the browser's location field that does not include a "." are sent via HTTP to a server at "netscape.com". The keyword server pulls the string and compares it to several separate lists of keyword-URL pairs. If the keyword system finds a match, it redirects the user's browser to the URL of the keyword-URL pair. Failing a match against the lists, the user's browser is redirected to a Netscape Search page with the typed string as the search query. The "." versus " " is a key factor in determining what services are used. The detection of a "." implies a domain name whereas the detection of a " " implies a search request.

The autosearch feature of Microsoft Internet Explorer (MSIE) is another example of an improvement to the location field of a web browser. The details of the autosearch feature is disclosed in U.S. Pat. No. 6,009,459 issued on Dec. 28, 1999 by Belfiore, et al., entitled, "Intelligent automatic searching for resources in a distributed environment." The '459 patent specifies a mechanism for a computer system to automatically and intelligently determine what a user intended when the user entered text within the location field of a web browser. Often users improperly enter URLs or enter search terms in a user interface element that requires URLs. If the user enters text that is not a URL, the system may first try to construct a valid URL from the user-entered text. If a valid URL can not be constructed, the browser then automatically formats a search engine query using the user-entered text and forwards the query to an Internet search engine.

In addition, the '459 patent specifies a template registry that categorizes the specific suitability of a plurality of search engines to locate web sites related to a determined meaning of the specified text. The template is an entry in the registry that includes replaceable characters that may be replaced with the processed text. An example template registry entry that causes the Yahoo! search engine to be called is "http://msie.yahoo.com/autosearch?% s". The % s is filled in with information regarding the search terms.

Furthermore, the '459 patent specifies a method which provides for automatically deleting prefix terms from input that are identified as not necessary to perform a search based on the determined meaning of the entered input. Directive terms such as "go" or "find" followed by search terms may be entered within the location field. Such users intend for the web browser to locate web pages that are identified by terms within the text. As the directive terms do not contain content that is useful in conducting a search, these prefix terms are dropped from the text. Though prefixes may help process keywords in a more specific way, there are no such prefixes in use for specifying how domain names may be processed through a user interface element used for search requests, resolution requests, and registration requests. For example, search engine web sites have specified a list of prefixes to assist in performing a more specific search request. Any such prefixes have no relevance to domain names [e.g., valid domain names (VDNs) and fictitious domain names (FDNs)] but to that of keywords and phrases.

There have been advances with respect to submitting keyword search requests to search engines. RealNames and other companies like Netword use plain language as a means for resource location and have developed their own version of resolution services. Using simplified network addresses in the form of keywords/phrases as opposed to the conventional form of URLs in the DNS, offers the possibility to further contemplate the differences between search requests and resource location. Though an observable fact, little if any has been done to provide integration tools to support these differences. To date, the only advancement demonstrated are the partnerships made with RealNames and different portal web sites. When a search request is performed, input may be forwarded to a RealNames server concurrent with the original search request and if there are any matches, the first result displayed may be a registered RealName which links to a registered web site followed by displaying the search results from the search request.

Though RealNames demonstrates using keywords and phrases from a search request for resource location, there are no methods for detecting a domain name or URL as input from a search request. In effect, a domain name is processed as a literal string or keyword. For example, when a popular web site such as "news.com" is processed from input there is a high probability that the URL "http://news.com" would be displayed within the top few search results. There are no systems that provide such a URL as a first result. However, when a domain name is reserved and has no web site or the domain name corresponds to a web site with little traffic (e.g., web pages having no META tags, etc.), there are no search results, and in turn, no hyperlinks are displayed. This observation is apparent upon surveying the search results of hundreds of search engines, which clearly indicate that a domain name is processed as a literal string only without consideration for processing input in any way aside from that of a search request. There have been some improvements by providing links to other vendors such as processing the search request and responding with a link for a book search at "amazon.com" or the like, but there are no such links that provide vendor domain name related services or online identity services in response to a search request.

FIG. 1a depicts a typical output from a search portal web site for the input "zipnames.com". Results are returned to output such as "found no document matching your query", and generates hyperlinks that use the input as a search request from another URL. Such links may redirect to shopping sites and reference sites or to other search engines. FIGS. 1b and 1c depict output from a metasearch site for the input "zipnames.com". Again, the output depicts links that are generated for searching input at another web address. It is clear from these results that no provisions have been made to detect the presence of a domain name before processing a search request.

If a search request may detect that a domain name is processed as is and/or as a network address then steps of resource location and the use of resolution services or registration services may be made in addition to the search request. No search engines or existing services make use of the "." delimiter to extend searching into the realm of processing resolution and/or registration services. Any results that are returned from a search request are based on finding a database match to the domain name as a keyword or literal string. Currently, there are no search engines or resources that generate a link for WHOIS results in response to receiving a network address such as a domain name, FQDN, or URL and may be listed or redirected as part of search results.

To date, search services, resolution services, and registration services have remained as separate services. New utility may be demonstrated by combining these separate services into a unified service. Accordingly, in light of the above, there is a strong need in the art for a system and method for integrating and enhancing resolution services, search services, and registration services.

SUMMARY

The present invention enables the seamless integration between resource location, search, and registration services. The invention enables a search request to be processed as a literal string, network address, or both. The present invention generates and displays at least one hyperlink at the top of standard search results where the link may access a URI or NIC registration of an available domain name in the form of "keyword.TLD".

The invention enables a plurality of identifiers to be processed as input and displayed as a resolution request. The present invention enables the integration of metalinks as part of search results and registration results. The invention enables the use of identifier prefixes as a command language. The present invention enables a user to edit, list, obtain the status and history, select, renew, transfer, escrow, auction, bid, valuate, purchase, sell, lease, redirect, lock, web host, incorporate, trademark, locate, and dial a domain name.

The present invention enables more specific error messages to be generated in response to an input request. The invention enables search results to be integrated a part of the results from a registration request. The present invention enables the integration of metalinks (e.g., maps, after market domain name information, etc.) as part of results from a WHOIS request. The invention enables distributed WHOIS caching to minimize network connection bandwidth. The present invention enables the real-time display of registrant information that corresponds to a current URI. The invention enables automatic notification of any identifiers that may soon be available in response to accessing such an identifier.

In general, in accordance with the present invention, a method includes retrieving a WHOIS record of a domain name at a first time, the WHOIS record including an expiry date of a second time, calculating a time difference value between the first time and the second time, and providing the time difference value to a user.

Time difference value can be determined to satisfy at least one condition including a threshold value. An indication can be provided to the user that the at least one condition has been satisfied such as notifying the user of domain name expiration status, storing the domain name in a user expiration watch list, monitoring the domain name for expiration upon or after the second time, and attempting to register the domain name with a selected domain name registration provider after the second time or upon determining that either the domain name may soon be available for registration or available for registration.

The WHOIS record can be retrieved in response to receiving or obtaining a request such as a resource location request, domain name resolution request, search engine request, WHOIS request, domain name availability request, and domain name registration request.

In accordance with other aspects of the present invention, a method for providing content to a user includes, retrieving the content for the user, determining that the content includes at least one domain name, providing the content to the user, and providing the user with one of a domain name aftermarket status and capability of determining aftermarket status of the at least one domain name at any time upon or after the determining that the content includes the at least one domain name.

The content can be retrieved from at least one of a WHOIS record and search engine results in response to one of a receiving and obtaining a request such as a resource location request, domain name resolution request, search engine request, WHOIS request, domain name availability request, and domain name registration request. The aftermarket status of the at least one domain name can be determined by consulting a domain name status database indicating whether the domain name is soon to be available for registration, sale, license, or lease by one of a registrant, domain name broker, auction service, and listing service.

In accordance with yet other aspects of the present invention, a method for presenting enhanced search results from a request to search internet content includes retrieving at least one search result from the request to search the internet content wherein the at least one search result includes an uniform resource identifier (URI) having a domain name, the URI corresponding to the Internet content, generating at least one hyperlink corresponding to each the URI having the domain name, each the hyperlink capable of accessing additional information relating to one of an URI and domain name wherein the additional information is selected from a group consisting of domain name after market status information, sitemap information when the URI does not correspond to the sitemap information, and homepage information when the URI does not correspond to the homepage information, generating the enhanced search results by combining each the search result having the URI with each the hyperlink corresponding to each the URI, and presenting the enhanced search results.

In accordance with still other aspects of the present invention, a method for processing input includes receiving input including-at least one identifier prefix and at least one identifier from one of a internet search engine user interface and location field user interface and performing an operative function upon the at least one identifier in accordance with the at least one identifier prefix wherein the identifier prefix selects identifier management type functions.

In accordance with another aspect of the present invention, a method includes one of a parsing and generating a search request to search internet content from one or more identifiers, performing an Internet content search in accordance with said search request, retrieving at least one search result from said internet content search, one of a parsing and generating at least one domain name from the one or more identifiers, and determining whether said at least one domain name is available for registration either one of a before, during, and after presenting said at least one search result from said Internet content search.

In accordance with still another aspect of the present invention, a method includes one of a parsing and generating at least one domain name from one or more identifiers, performing a domain name availability request having said at least one domain name, retrieving at least one result from said domain name availability request, generating a search request to search internet content, said search request including the one or more identifiers, and determining whether to perform an internet content search in accordance with said search request either one of a before, during, and after presenting said at least one retrieved result from said domain name availability request.

In accordance with yet additional aspects of the present invention, a system which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF THE DRAWINGS

FIG. 6a illustrates the prior art for the typical output of a search request.

FIG. 6b illustrates modifications to the output of the search request that extends the functionality of the search results in accordance with the present invention.

FIG. 6c illustrates the page source of the output discussed in FIG. 6b in accordance with the present invention.

FIG. 7d is a flowchart illustrating the steps performed for integrating search results with registration results in accordance with the present invention.

FIG. 7e is a flowchart illustrating the steps performed for extending functionality of WHOIS results in accordance with the present invention.

FIG. 7f illustrates the prior art of a typical WHOIS output for a domain name.

FIG. 7g illustrates the page source of modified WHOIS output to extend functionality in accordance with the present invention.

DETAILED DESCRIPTION

Figure 1A:
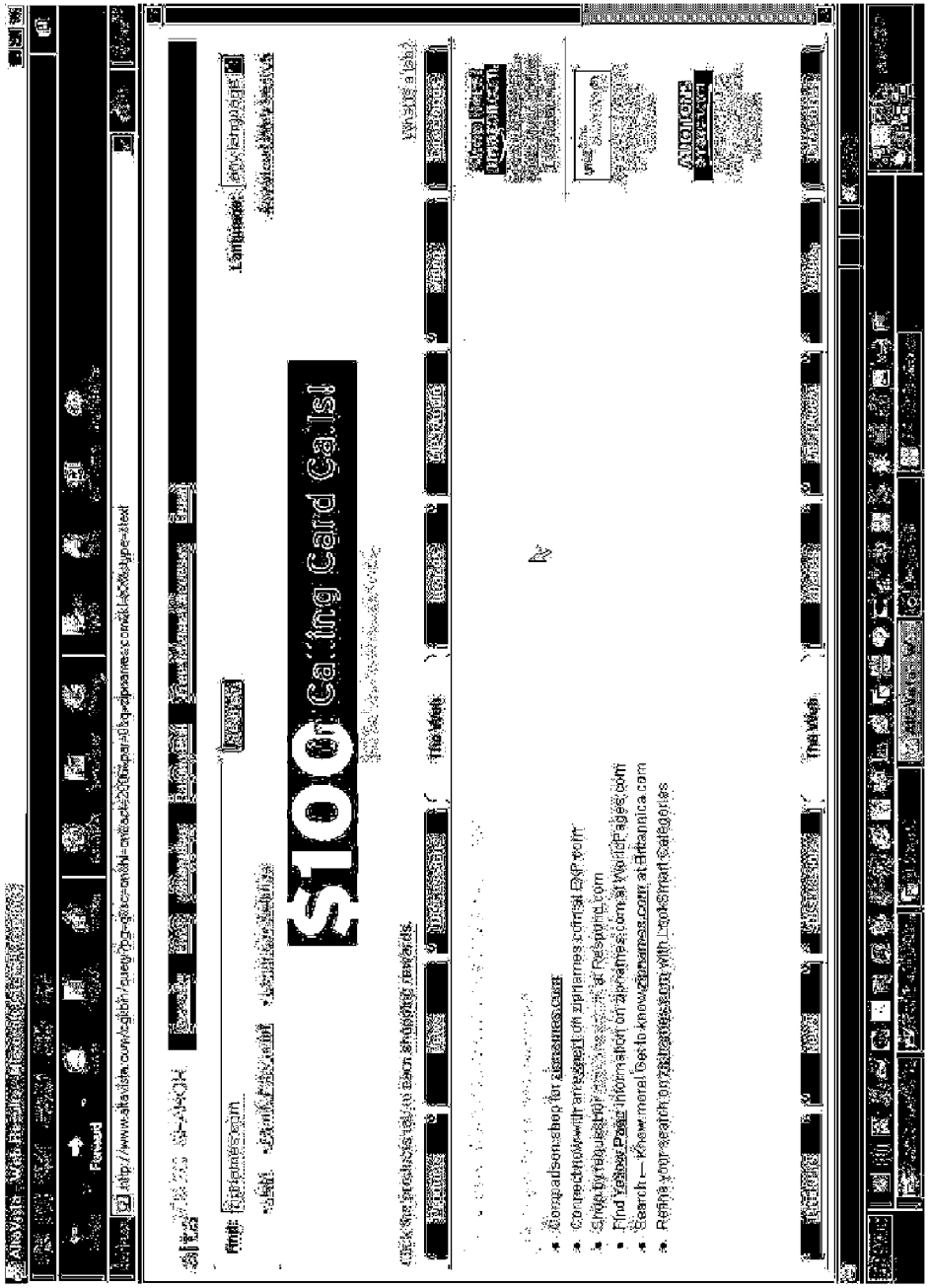
FIG. 1a illustrates an exemplary prior art web page after search results have been returned in response to a domain name being entered into a search text box.
Figure 1B:
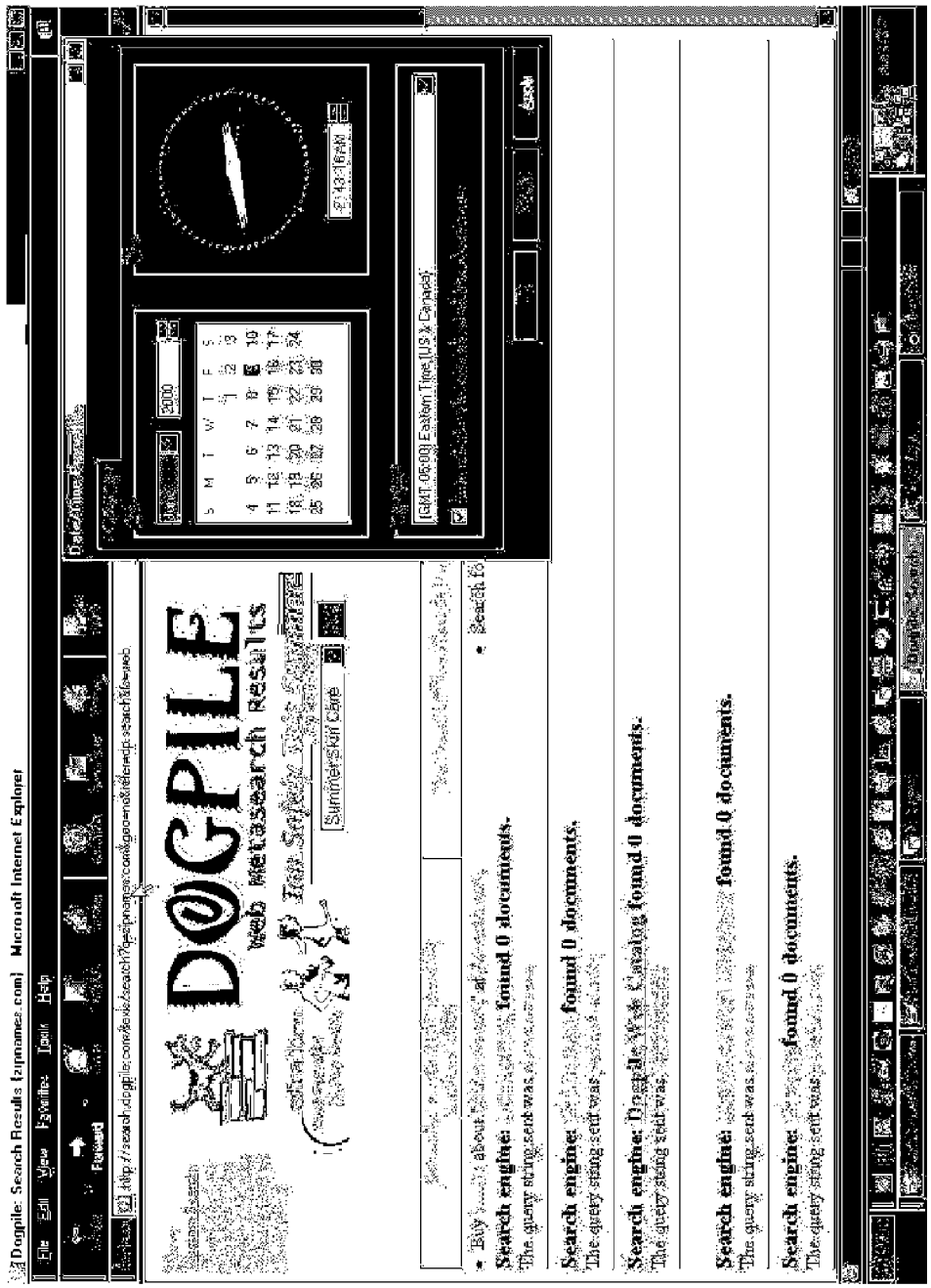
FIG. 1b illustrates an exemplary prior art top portion of a web page after search results have been returned from many search engines in response to a domain name being entered into a search text box.
Figure 1C:
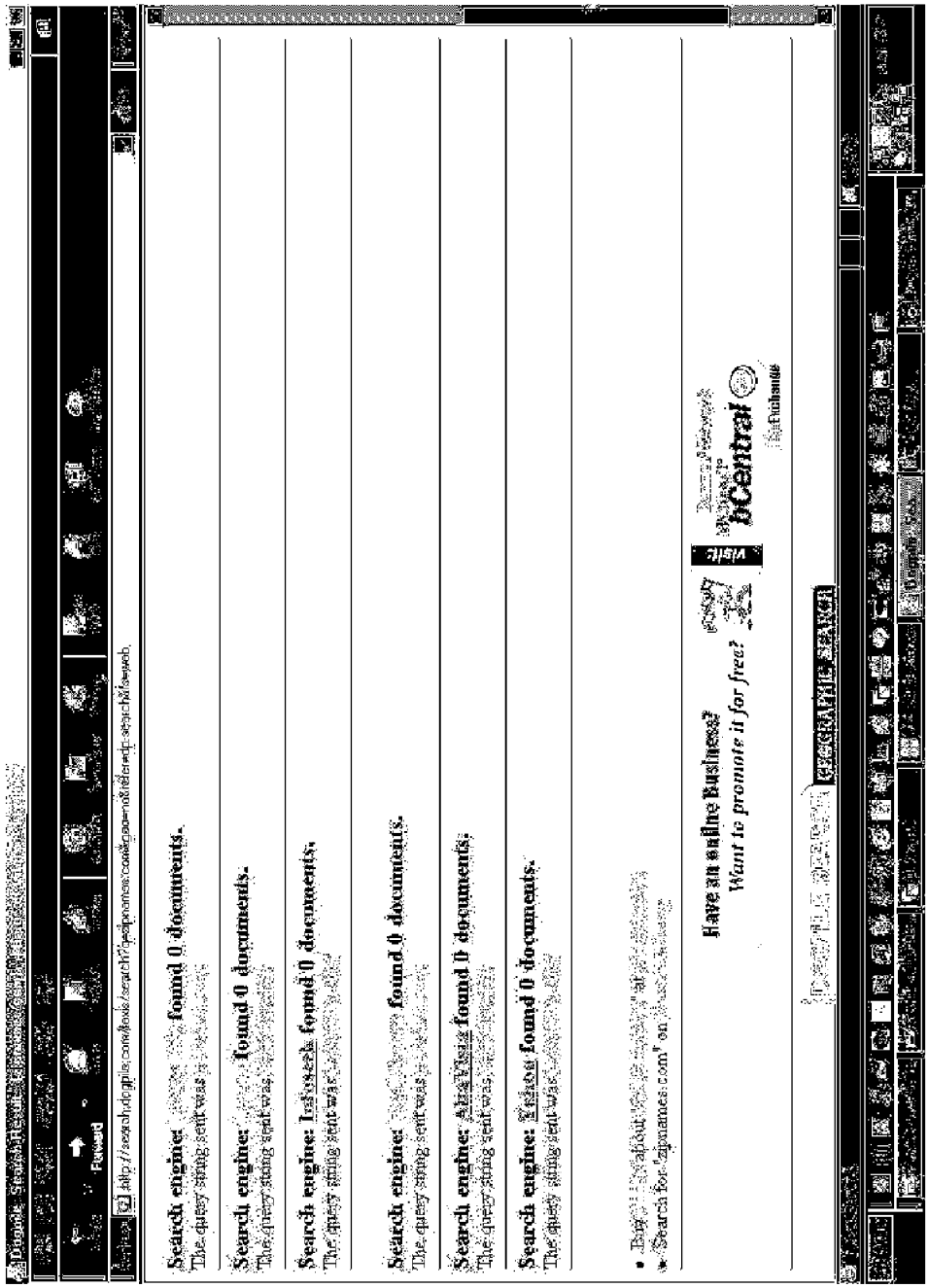
FIG. 1c illustrates the bottom portion of the web page depicted in FIG. 1b.

The present invention will now be described with reference to the drawings, wherein like reference numerals are used to refer to like elements throughout.

Figure 1D:
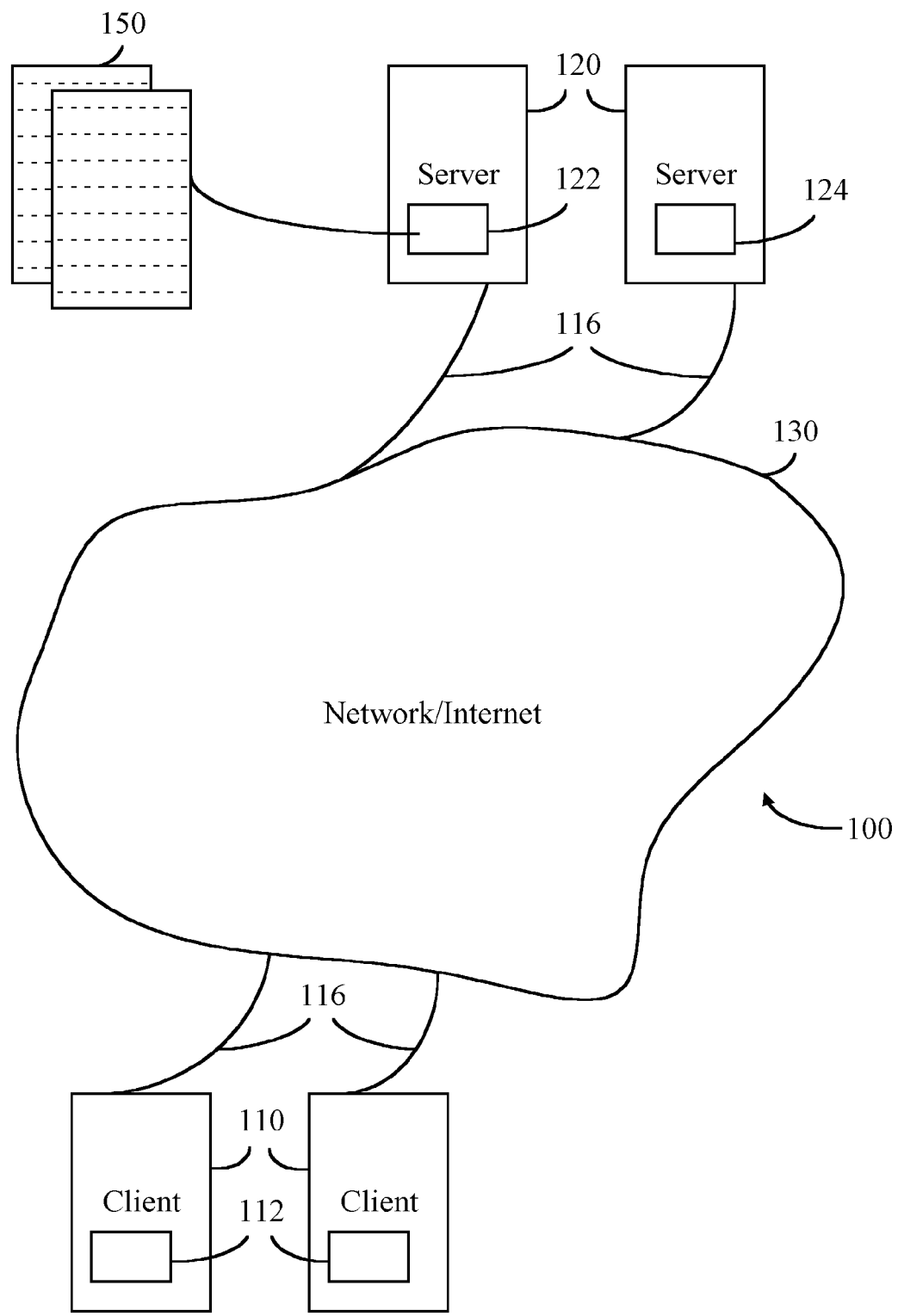
FIG. 1d is a block diagram of an exemplary distributed computer system in accordance with the present invention.

FIG. 1d illustrates an exemplary system for providing a distributed computer system 100 in accordance with one aspect of the present invention and may include client computers or any network access apparatus 110 connected to server computers 120 via a network 130. The network 130 may use Internet communications protocols (IP) to allow clients 110 to communicate with servers 120. The network access apparatus 110 may include a modem or like transceiver to communicate with the electronic network 130. The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may provide an on-line service, an Internet service provider, a local area network service, a wide area network service, a cable television service, a wireless data service, an intranet, a satellite service, or the like.

The client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, a network television, an internet television, a set top box, a web-enabled telephone, an internet appliance, a portable wireless device, a television receiver, a game player, a video recorder, and/or an audio component, for example.

Each client 110 typically includes one or more processors, memories, and input/output devices. An input device may be any suitable device for the user to give input to client computer 110, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye tracking device, or any MIDI device may also be used. A display device may be any suitable output device, such as a display screen, text-to-speech converter, printer, plotter, fax, television set, or audio player. Although the input device is typically separate from the display device, they could be combined; for example: a display with an integrated touchscreen, a display with an integrated keyboard, or a speech-recognition unit combined with a text-to-speech converter.

The servers 120 may be similarly configured. However, in many instances server sites 120 include many computers, perhaps connected by a separate private network. In fact, the network 130 may include hundreds of thousands of individual networks of computers. Although the client computers 110 are shown separate from the server computers 120, it should be understood that a single computer may perform the client and server roles. Those skilled in the art will appreciate that the computer environment 100 shown in FIG. 1d is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional input/output devices. Those skilled in the art will appreciate that the present invention may also be practiced via Intranets and more generally in distributed environments in which a client computer requests resources from a server computer.

During operation of the distributed system 100, users of the clients 110 may desire to access information records 122 stored by the servers 120 while utilizing, for example, the Web. Furthermore, such server systems 120 may also include one or more search engines having one or more databases 124. The records of information 122 may be in the form of Web pages 150. The pages 150 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 150. The browser programs 112 enable users to enter addresses of specific Web pages 150 to be retrieved. Typically, the address of a Web page is specified as a URI or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

Figure 1E:
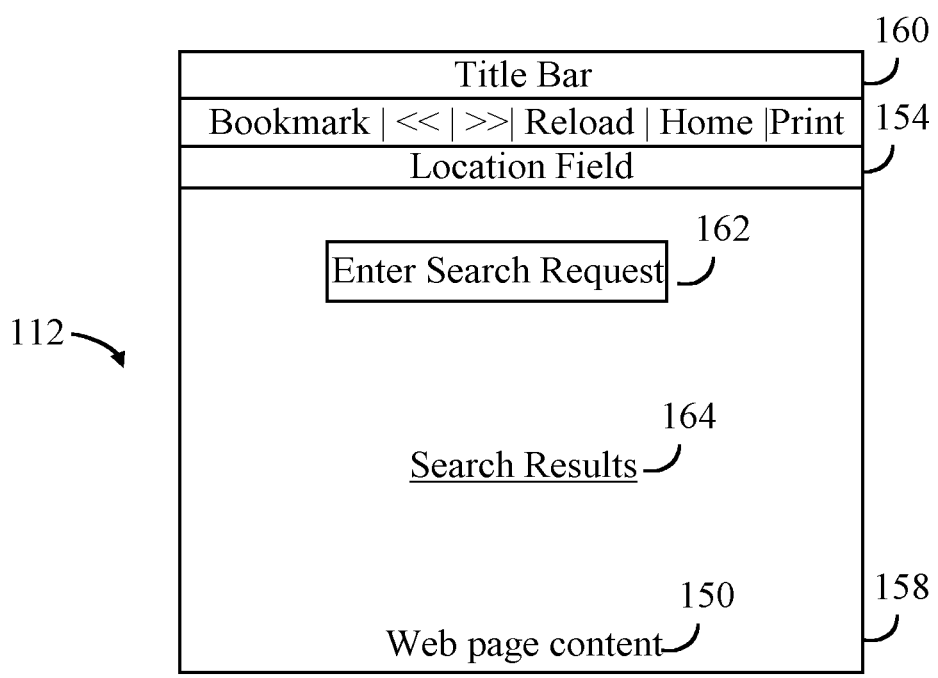
FIG. 1e is a diagram depicting the location field or web page search request used in a conventional web browser.

FIG. 1e more specifically illustrates an exemplary selection of common operative components of a web browser program 112. The web browser 112 enables a user to access a particular web page 150 by typing the URL for the web page 150 in the location field 154. The web page 150 contents corresponding to the URL from the location field 154 may be displayed within the client area of the web browser display window 158, for example. Title information from the web page 150 may be displayed in the title bar 160 of the web browser 112. The web page 150 contents may further include a user interface element such as that of an input text box 162 for inputting search requests and, in turn, search results having identifiers 164 such as a hyperlink or URL.

Figure 1F:
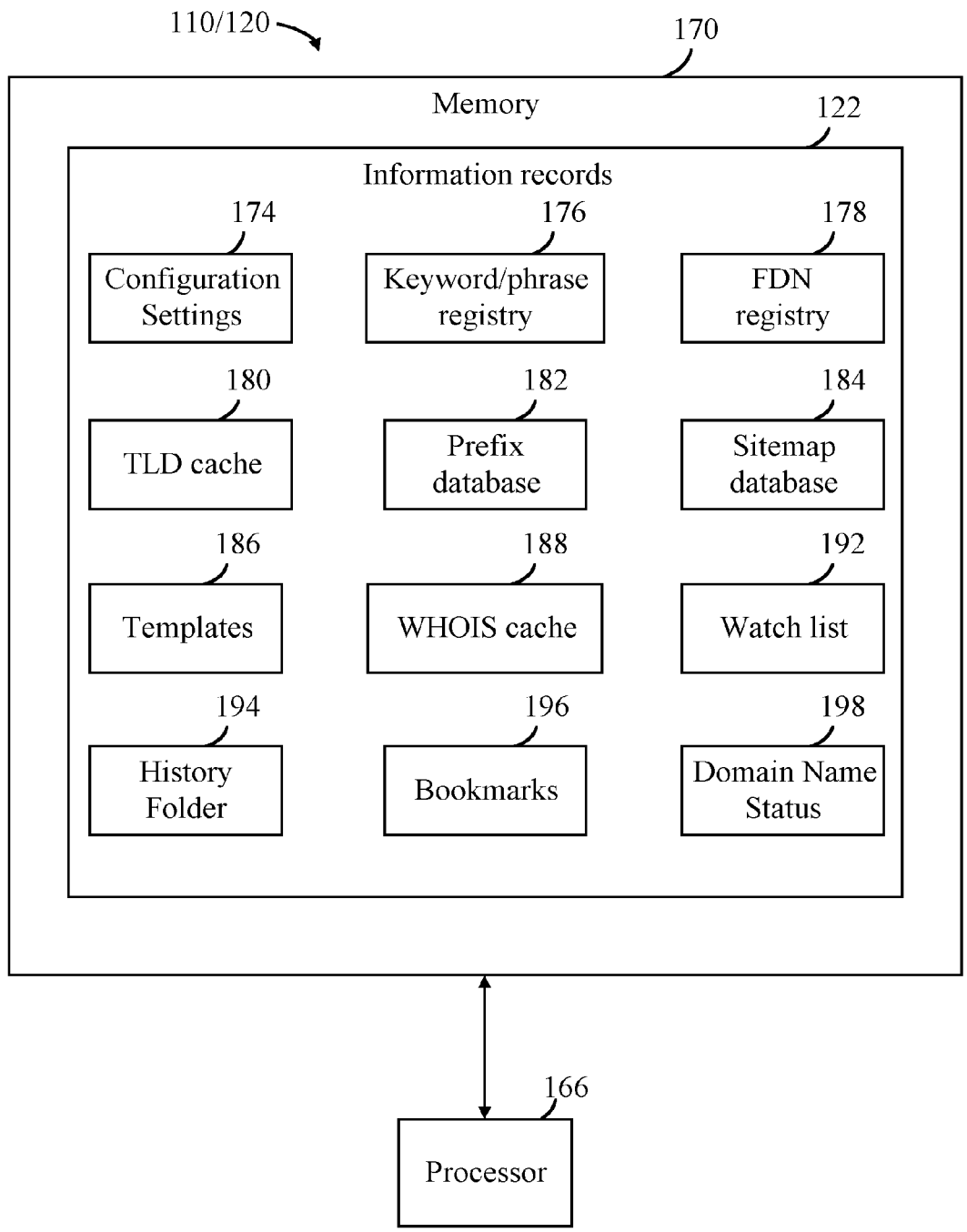
FIG. 1f is a block diagram illustrating exemplary information records stored in memory in accordance with the present invention.

FIG. 1f illustrates a block diagram of a processor 166 coupled to a storage device such as memory 170 in a client 110 and/or server 120 computing system. Stored in memory may be information records 122 having any combination of exemplary content such as lists, files, and databases. Such records may include for example: configuration settings 174, keyword/phrase registry 176, FDN registry 178, TLD cache 180, prefix database 182, Templates, 186, WHOIS cache 188, Available/expired names 190, Domain watch list 192, History folder 194, Bookmarks 196, and domain name status database 198. These information records are further introduced and discussed in more detail throughout the disclosure of this invention.

Figure 2A:
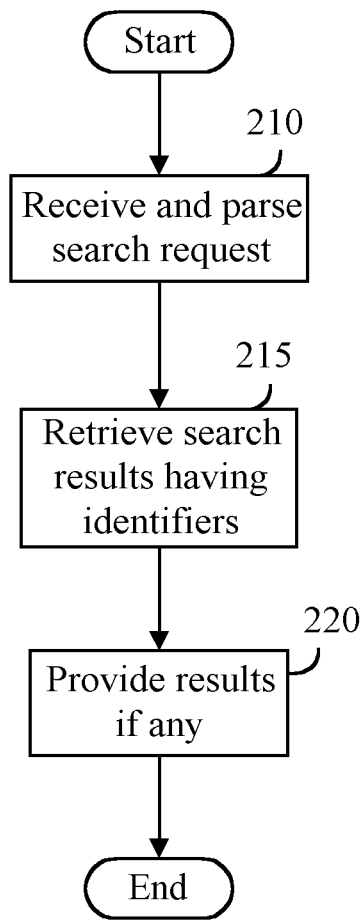
FIG. 2a is a flowchart illustrating the steps performed by a prior art system for providing search results.

FIG. 2a is a toplevel flowchart illustrating the steps of an exemplary prior art system for processing a search request. A client system, network access apparatus 110, servlet, applet, stand-alone executable program, command line of a device such as a phone browser, or user interface element such as a text box object or location field 154 of a web browser 112, receives and parses a search request in step 210. The search request is sent to a server system 120 including a search engine/database 124 and search results having identifiers are retrieved in step 215 by the client system 110. The search request is generally passed as a query to access a database stored on the server system 120 and the retrieved identifiers may represent network resources in the form of URLs or hyperlinks. Results, if any, are then notified, accessed, and/or displayed in step 220.

Figure 2B:
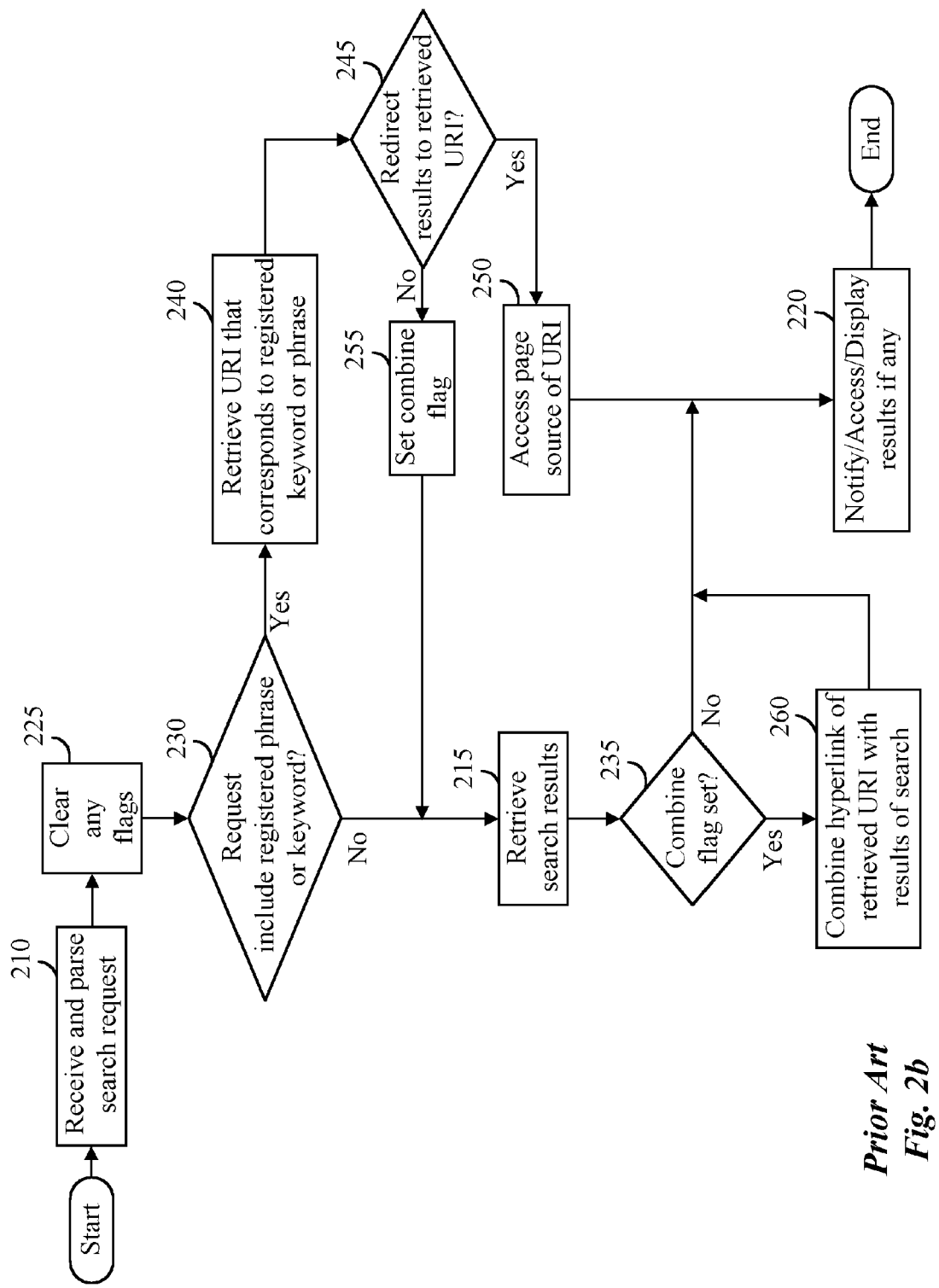
FIG. 2b is a flowchart illustrating the steps performed by a prior art system for providing search results including a hyperlink for any registered keyword or phrase.

FIG. 2b is a toplevel flowchart illustrating the steps of an exemplary prior art system for combining search results of a search request and any portion of the search request having a registered phrase or keyword. A network access apparatus 110, servlet, applet, stand-alone executable program, command line of a device such as a phone browser, or user interface element such as a text box object or location field 154 of a web browser 112, receives and parses in step 210 input such as text or voice. A combine flag is then cleared in step 225. A determination may be made in step 230 by consulting a keyword/phrase registry 176 as to whether the search request includes a registered phrase or keyword, and if not, then search results are retrieved in step 215. Since the combine flag is determined in step 235 to not be set, then results if any, are provided in step 220.

However when it is determined in step 230 that the search request does include a registered phrase or keyword, then at least one URI may be retrieved in step 240 that corresponds to the registered keyword or phrase. A determination may be made in step 245 as to whether to redirect results to the retrieved URL If so, then the page source of the URI is accessed in step 250 and results, if any, may then be notified, accessed, and/or displayed in step 220. However when it is determined in step 245 that results are not redirected to the URI then the combine flag is set in step 255 and search results may be retrieved in step 215. Since the combine flag is determined in step 235 to be set, the hyperlink of the retrieved URI is combined in step 260 with search results, and such results if any, may then be notified, accessed, and/or displayed in step 220.

Figure 2C:
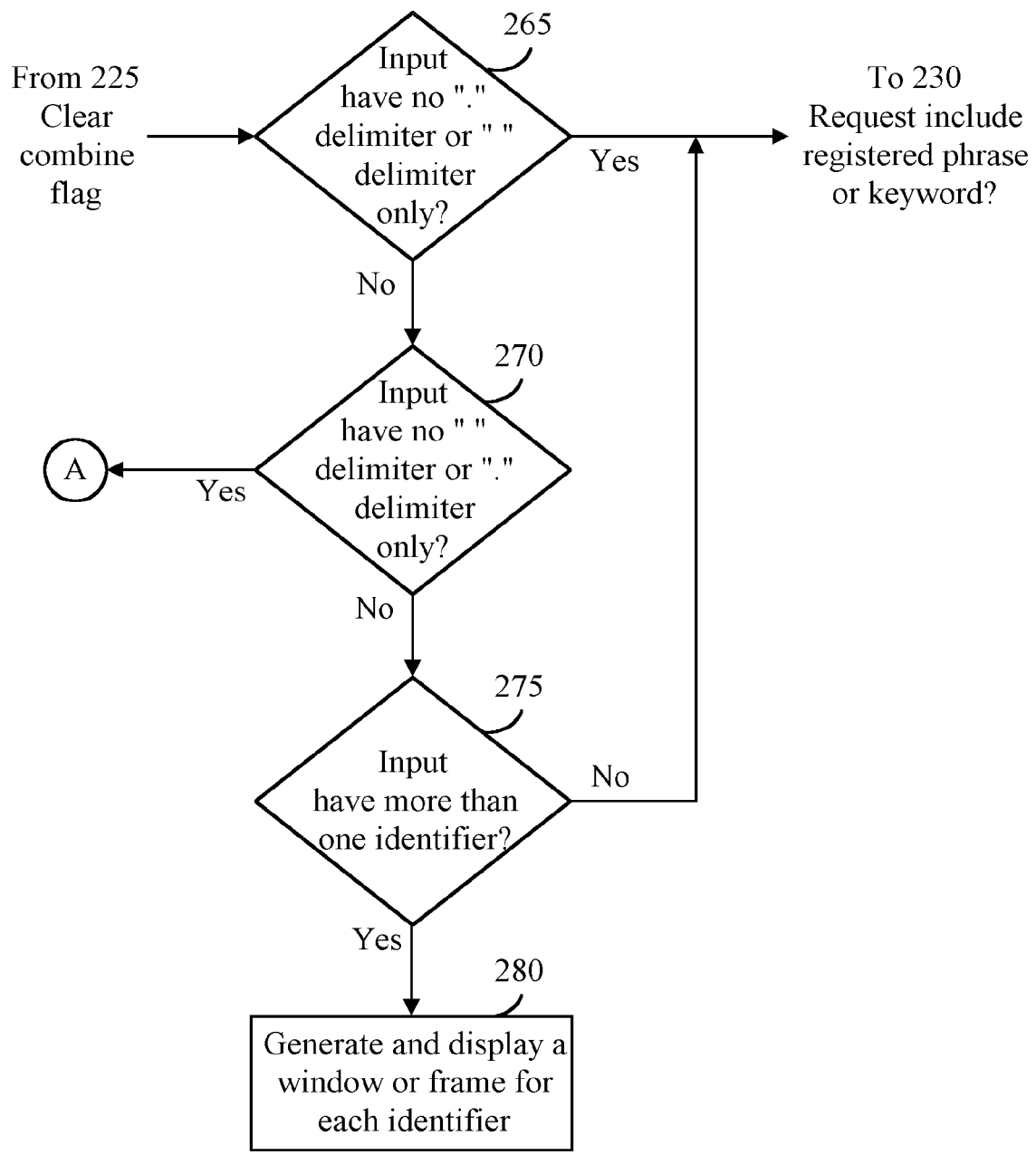
FIG. 2c is a flowchart illustrating the steps performed for determining how to process received input in accordance with the present invention.

FIG. 2c is a flowchart showing steps in accordance with the present invention for determining how to process received input 210. After input is received and/or any flags that may have been cleared, it may be determined in step 265 whether input includes no "." delimiters or " " delimiters only. When this is the case, then no domain name or IP address is present and input may be processed as a search request or it may further be determined in step 230, whether input includes a registered phrase or keyword by consulting a keyword/phrase registry 176, otherwise it may be determined in step 270 whether input includes "." delimiters only or no " " delimiters. When the presence of the "." delimiter is determined, the input may include either an IP address or domain name. When a domain name is detected, the validity of the domain name is determined. When input includes both at least one delimiter and at least one "." delimiter then it is determined in step 275 whether the input includes more than one identifier. When more than one identifier has been determined, then a window or frame for each identifier is generated and/or displayed in step 280. For example, when input such as "news.com wired.com" is received as input for a resolution request or search request, a window for each domain name is opened (e.g., tiled as a split screen) for accessing content from each web site.

Figure 3A:
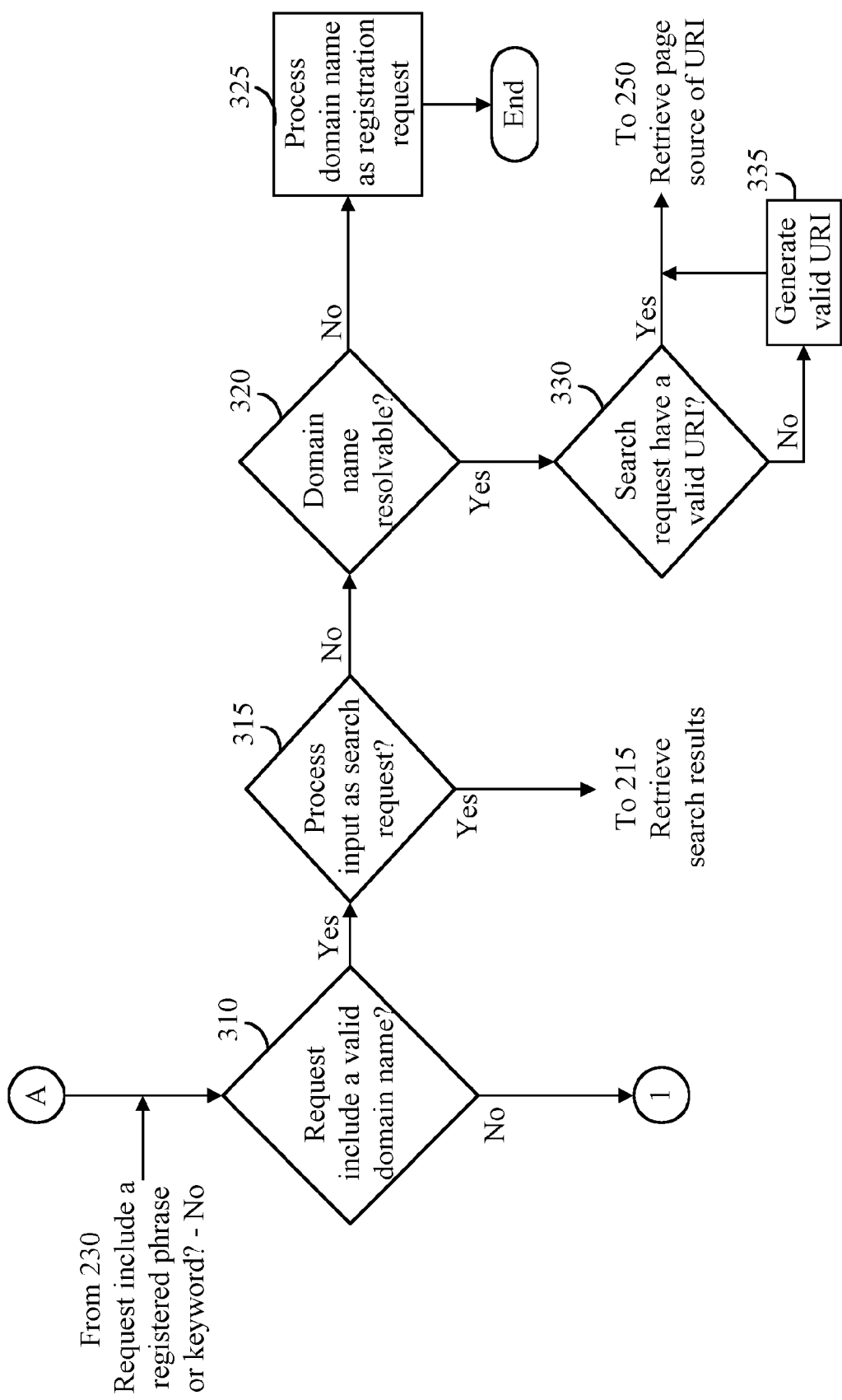
FIG. 3a is a flowchart illustrating the steps performed for processing a resolution or registration request from a search request having a valid domain name in accordance with the present invention.

FIG. 3a is a toplevel flowchart illustrating the steps for integrating registration and/or resolution services with search services in accordance with the present invention. When it is determined in step 230 that the search request does not include a registered phrase or keyword, then it may further be determined in step 310 whether the request includes a valid domain name (VDN). For example, a TLD cache 180 may be used as part of one aspect for determining validity. Validity of URI syntax is provided in T. Berners-Lee, "Informational RFC (Request for Comment) 1630: Universal Resource Identifiers in WVVW—A Unifying Syntax for the Expression of Names and Addresses of Objects on the Network as used in the World-Wide Web", Internet Engineering Task Force (IETF), June 1994, "http://www.faqs.org/rfcs/rfc1630.html", which is herein incorporated by reference.

When the request is determined in step 310 to include a valid domain name, it may then be determined in step 315 whether to perform a search request with the input as a literal string. Search results may be retrieved in step 215. A search request may be initiated by selecting an exact phrase option from a listbox or by surrounding the input with a delimiter such as the quote sign (e.g., "example.com") to process the detected domain name as a literal string, otherwise a domain name detected from input may be processed as a registration and/or resolution request. When it is determined that the input is instead processed in step 315 as a resolution and/or registration request, then the resolvability and/or availability of the domain name may be determined in step 320. When the domain name is determined in step 320 to be not resolvable, then the domain name is processed in step 325 as a registration request. Domain name resolution is explained in P. Mockapetris, "Informational RFC (Request for Comment) 1035: Domain Names—Implementation and Specification", Internet Engineering Task Force (IETF), November 1987, "http://www.faqs.org/rfcs/rfc1035.html", which is herein incorporated by reference.

A WHOIS request is performed to determine domain name availability. When a domain name is already registered (e.g., determined not available), registrant information may be provided to the client system. However, when the domain name is available, a registration form may be processed and submitted to a registrar and/or registry and to it's partners and/or affiliates. Specification of the WHOIS protocol is provided in K. Harrenstien, M. Stahl, and E. Feinler, "Informational RFC (Request for Comment) 954: NICNAME/WHOIS", Internet Engineering Task Force (IETF), October 1985, "http://www.faqs.org/rfcs/rfc954.html", which is herein incorporated by reference.

When it is determined in step 320 that the domain name is resolvable and further determined in step 330 that the search request includes a valid URI then the page source of the URI may be accessed in step 250 and results, if any, may then be notified, accessed, and/or displayed in step 220. When the search request does not include a valid URI as determined in step 330, then a valid URI may be generated in step 335 and the page source of the URI may then be accessed in step 250.

Figure 3B:
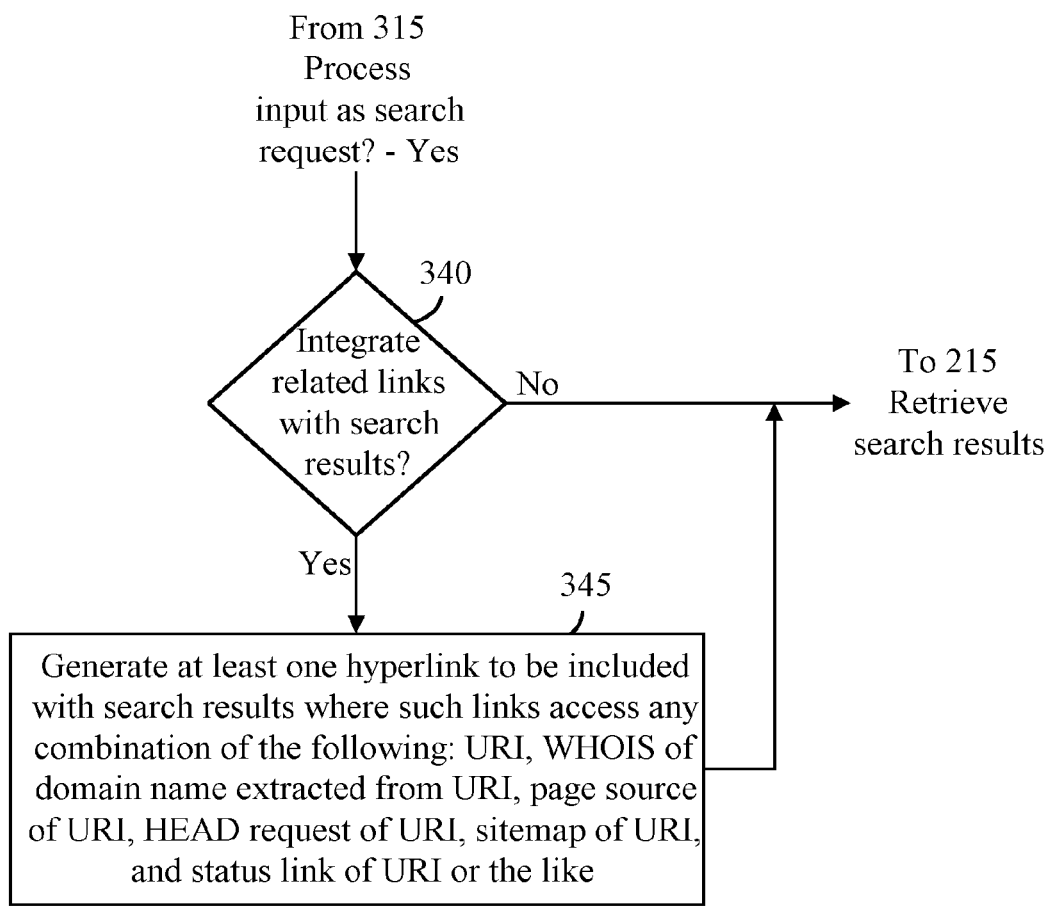
FIG. 3b is a flowchart illustrating the steps performed for integrating metalinks as part of search results in accordance with the present invention.

FIG. 3b illustrates how search results may be enhanced by providing links to URIs of meta-information generated from domain names in accordance with the present invention. When it is determined in step 315 that a valid domain name is to be processed as a search request, the determination of whether to integrate links of meta-information or "metalinks" may be determined in step 340. When metalinks are to be integrated then at least one metalink may be generated in step 345 and included with any search results (step 215) where such metalinks may access any permutation of the following; URI of the domain name, WHOIS of the domain name, page source of the URI, HEAD request of URI, sitemap of URI, and domain name status or the like. Domain name status may indicate whether the domain name is available for sale, license, or lease by the registrant or through an auction and/or listing service. If metalinks are not integrated, then search results may be retrieved in step 215. Templates 186 may be used to generate metalinks.

In a hierarchical naming system such as the DNS, a first domain may represent the highest level domain (HLD). A HLD that is determined not resolvable is referred to as a Top Level Domain Alias (TLDA) whereas a resolvable HLD is referred to as a Top Level Domain (TLD). Any domain name that is not valid or any domain name having a TLDA is called a fictitious domain name (FDN). More information on FDNs may be found in co-pending patent applications (60/125,531; 60/135,751; 60/143,859; 09/532,500).

Figure 3C:
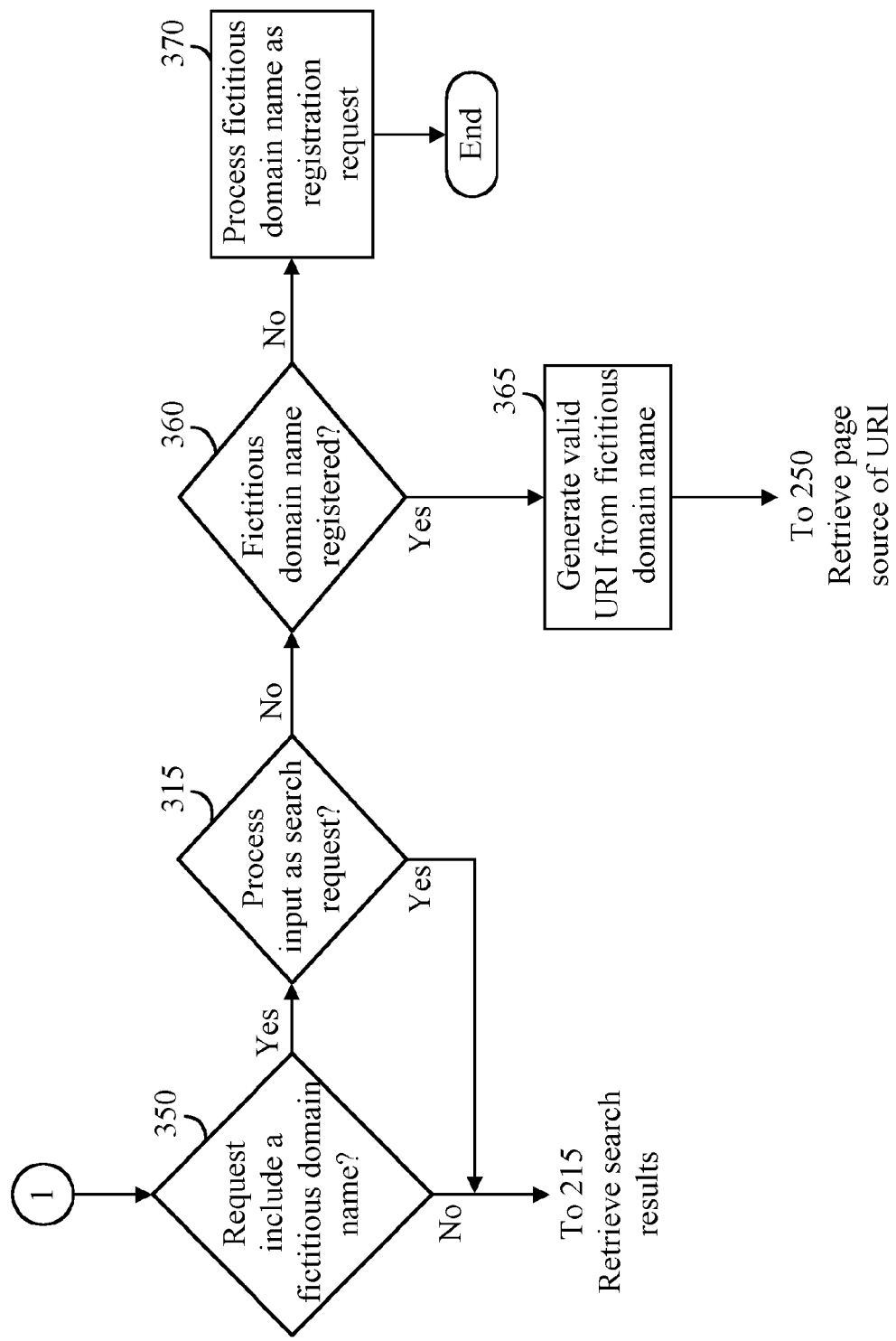
FIG. 3c is a flowchart illustrating the steps performed for processing a resolution or registration request from a search request having a fictitious domain name in accordance with the present invention.

FIG. 3c illustrates how FDNs may be integrated with search services in accordance with the present invention. When it is determined in step 230 that the search request does not include a registered phrase or keyword, then it may further be determined in step 350 whether the search request includes a FDN, by consulting a FDN registry 178. When the request is determined in step 350 to include a FDN, it then may be determined in step 315 whether to perform a search request with the input as a literal string. Search results may be retrieved in step 215. A search request may be initiated by selecting an exact phrase option from a listbox or surrounding the FDN with a delimiter such as the quote sign (e.g., "top-.stories") to process the detected FDN as a literal string, otherwise a FDN detected from input may be processed as a registration and/or resolution request. When it is determined that the input is instead processed in step 315 as a resolution and/or registration request, then the resolvability and/or availability of the FDN may be determined in step 320.

However, when it is determined not to process the input in step 315 as a search request, then it may be determined in step 360 whether the FDN is registered. When the FDN is to be registered, then a valid URI having a VDN is generated in step 365 from the FDN and the page source of the URI is accessed in step 250 and results, if any, may then be notified, accessed, and/or displayed in step 220. However, when it is determined in step 360 that the FDN is not registered, then the FDN may be processed in step 370 as a registration request. More information with respect to processing step 365 and/or step 370 may be found in co-pending patent applications (60/125,531; 60/135,751; 60/143,859; 09/532,500).

Figure 3D:
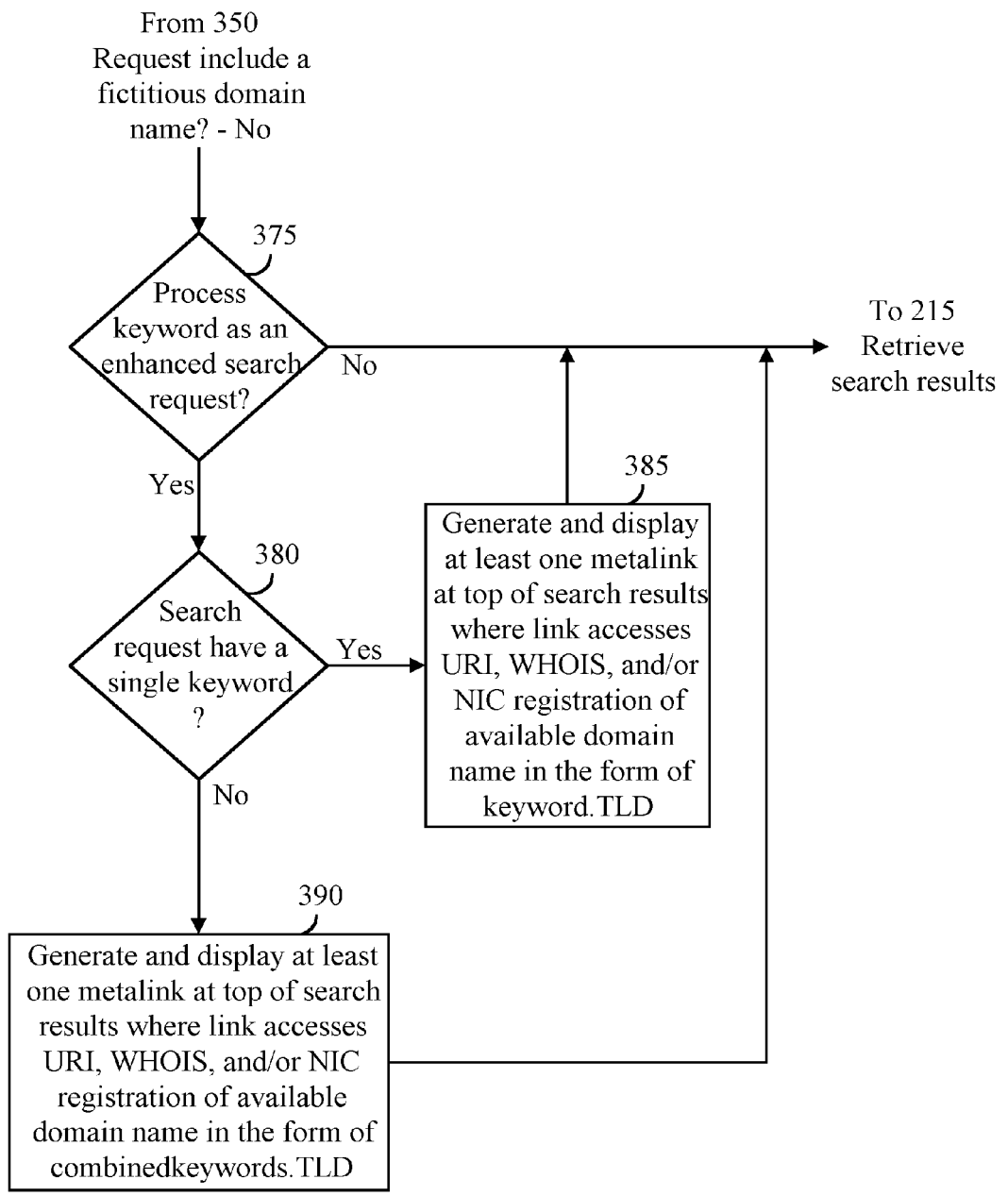
FIG. 3d is a flowchart illustrating the steps performed for integrating search results with available domain names that correspond to a given search request in accordance with the present invention.

FIG. 3d illustrates how search results may be enhanced by providing links to URIs generated from keywords in accordance with the present invention. When it is determined that input is not a VDN, FDN, or registered keyword/phrase then it may be further determined in step 375 whether input is processed as an enhanced search request by consulting the configuration settings 174. If not, then search results are retrieved in step 215. However, when an enhanced search request is determined in step 375 to be processed, then it may be determined in step 380 whether the search request is a single keyword. When the search request is a single keyword then at least one hyperlink is generated in step 385 and displayed at the top of search results (step 215) where additional links/metalinks may access the URI, WHO'S, and/or NIC registration of an available domain name in the form of "keyword.TLD". For example, "cars" is an entered keyword and returns metalinks of "cars.com", "cars.net", or the like in addition to search results on the keyword "cars".

When a search request has more than one keyword then at least one hyperlink may be generated in step 390 and displayed at the top of search results (step 215). A link/metalink may access the URI, WHOIS, and/or NIC registration of available domain name in the form of "combinedkeywords.TLD" (e.g., "best price" yields "bestprice.com" and "pricebest.com", etc.). The availability of such generated domain names may be determined in real-time by performing a plurality of WHOIS requests. Links may be displayed for all domain names determined available for registration. Additional domain names may be generated and/or determined available by adding word variations to a domain name (e.g., the word "now" yields "nowbestprice.com", "bestpricenow.com").

A domain name may be considered an object having many properties or attributes, methods, and events. For instance, a domain name may be bought, sold, leased, escrowed, transferred, edited, auctioned, listed, locked, trademarked, dialed, e-mailed, registered, and resolved or the like. A domain name may be considered a global network identifier. All such attributes may be used as prefixes for determining how a domain name is processed during any kind of request (e.g., resolution, search, and/or registration request). For instance, a prefix and domain name may be entered into a search text box, directly from the location field of a web browser, or received as text from a speech to text decoder.

Similar to how the MSIE Autosearch feature processes search request prefixes as specified in the '459 patent, more prefixes may be defined to satisfy requests other than that of search requests. A template 186 may be defined for each domain name prefix and used for generating a corresponding URL to perform a specific request, function, or result. For instance, the command "transfer example.com" or "transfer example.com from RegistrarA to RegistrarB" may be entered. The prefix "transfer" is detected and a search engine script or the MSIE Autosearch feature will insert the domain name "example.com" into a template to generate a URL which is used to redirect the client to registrar services for the specific purpose of transferring "example.com" from a current registrar to a newly selected registrar. FIGS. 4a through 4e illustrate steps performed for some commonly used prefixes. However, similar steps may be applied by those skilled in the art for any prefix and/or suffix that may perform an operative function for numerous types of identifiers (e.g., domain name, telephone number, IP address, ISBN, UPC, SKU, Driver's License, Trademark Number, Patent Number, Social Security Number, keyword, FDNs, screen name, username, alias, handle, phrase, slogan, etc.). Other domain name prefixes are shown in more detail in FIG. 5b.

Figure 4A:
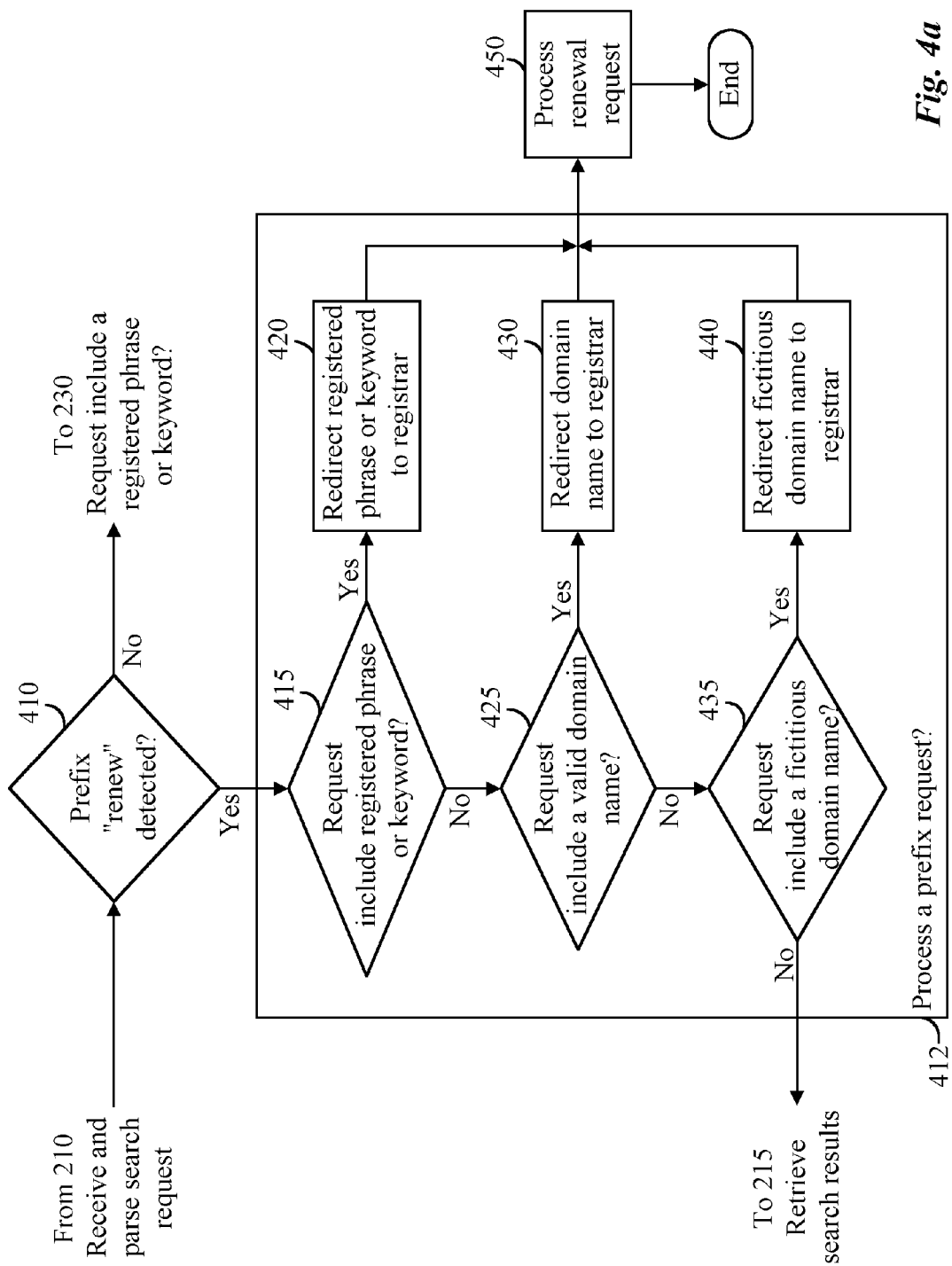
FIG. 4a is a flowchart illustrating the steps performed for processing a renewal request in response to detecting a "renew" domain name prefix from an input request in accordance with the present invention.

FIG. 4a illustrates how a "renew" prefix may be used as part of a search request to initiate registration services in accordance with the present invention. After a search request is received and parsed in step 210, it is then determined in step 410 whether the prefix "renew" was parsed. If not, then it may be determined in step 230 as to whether the search request includes a registered phrase or keyword. When it is determined in step 410 that the prefix "renew" was parsed, it is then determined in step 412 how the prefix request is processed. First, it may be determined in step 415 whether the request includes a registered phrase or keyword. If so, then the registered phrase or keyword is redirected in step 420 to a registrar for the purposes of processing in step 450 a renewal registration request. When it is determined in step 415 that the request does not include a registered phrase or keyword, then it may be determined in step 425 whether the request includes a valid domain name. If so, then the valid domain name is redirected in step 430 to a registrar for the purposes of processing in step 450 a renewal registration request. When it is determined in step 425 that the request does not include a valid domain name, then it may be determined in step 435 whether the request includes a FDN. If so, then the FDN is redirected in step 440 to a registrar for the purposes of processing in step 450 a renewal registration request. When it is determined in step 435 that the search request does not include a FDN, then search results may be retrieved in step 215.

Figure 4B:
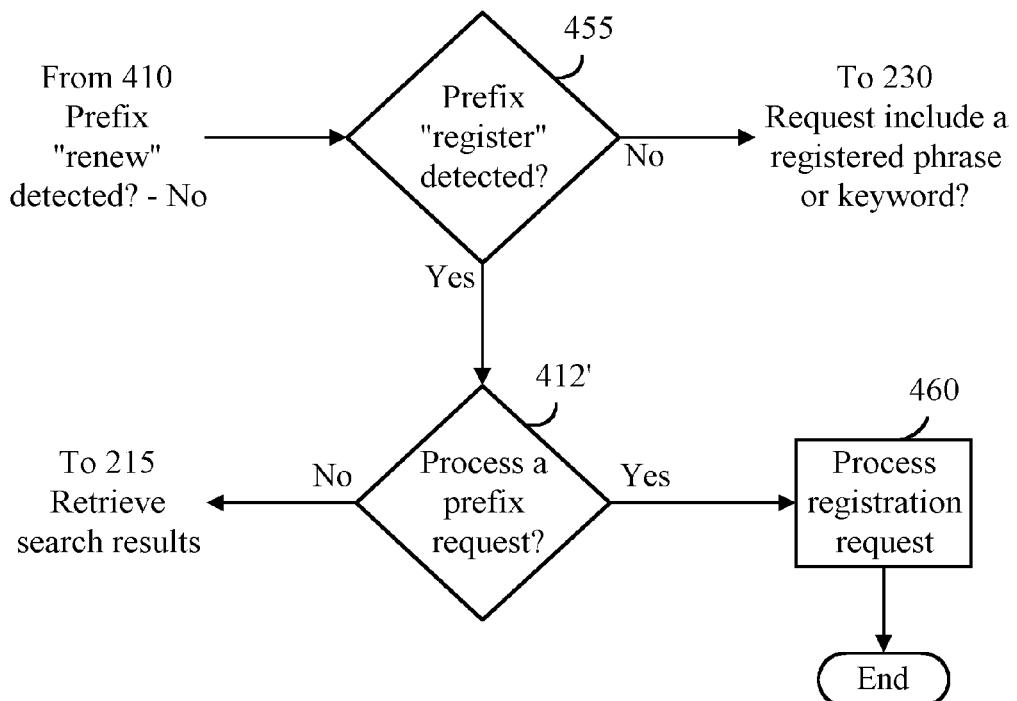
FIG. 4b is a flowchart illustrating the steps performed for processing a registration request in response to detecting a "register" domain name prefix from an input request in accordance with the present invention.

FIG. 4b illustrates how a "register" prefix may be used as part of a search request to initiate registration services in accordance with the present invention. After it is determined in step 410 that the prefix "renew" was not parsed, it then may be determined in step 455 whether the prefix "register" was parsed. If not, then it may be determined in step 230 as to whether the search request includes a registered phrase or keyword. When it is determined in step 455 that the prefix "register" was parsed, it is then determined in step 412 how the prefix request is processed. If the parsed prefix does not result in processing a registration request in step 460 then search results may be retrieved in step 215.

Figure 4C:
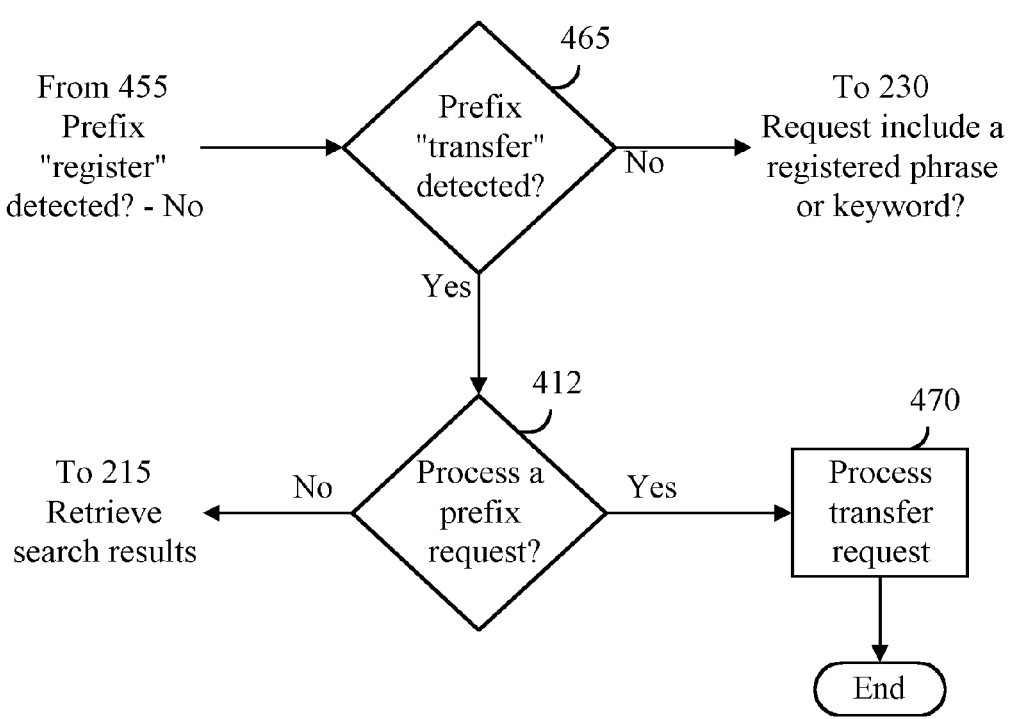
FIG. 4c is a flowchart illustrating the steps performed for processing a transfer request in response to detecting a "transfer" domain name prefix from an input request in accordance with the present invention.

FIG. 4c illustrates how a "transfer" prefix may be used as part of a search request to initiate transfer services in accordance with the present invention. After it is determined in step 455 that the prefix "register" was not parsed, it then may be determined in step 465 whether the prefix "transfer" was parsed. If not, then it may be determined in step 230 as to whether the search request includes a registered phrase or keyword. When it is determined in step 465 that the prefix "transfer" was parsed, it is then determined in step 412 how the prefix request is processed. If the parsed prefix does not result in processing a transfer request in step 470 then search results may be retrieved in step 215.

Figure 4D:
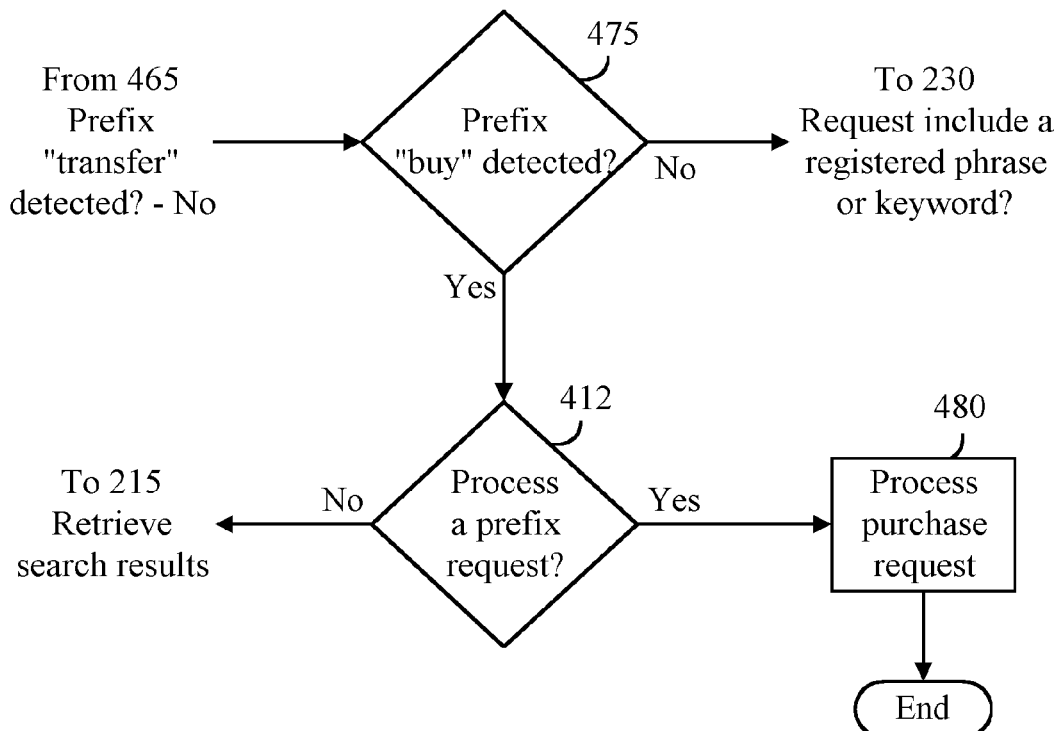
FIG. 4d is a flowchart illustrating the steps performed for processing a purchase request in response to detecting a "buy" domain name prefix from an input request in accordance with the present invention.

FIG. 4d illustrates how a "buy" prefix may be used as part of a search request to initiate purchasing services in accordance with the present invention. After it is determined in step 465 that the prefix "transfer" was not parsed, it then may be determined in step 475 whether the prefix "buy" was parsed. If not, then it may be determined in step 230 as to whether the search request includes a registered phrase or keyword. When it is determined in step 475 that the prefix "buy" was parsed, it is then determined in step 412 how the prefix request is processed. If the parsed prefix does not result in processing a purchase request in step 480 then search results may be retrieved in step 215.

Figure 4E:
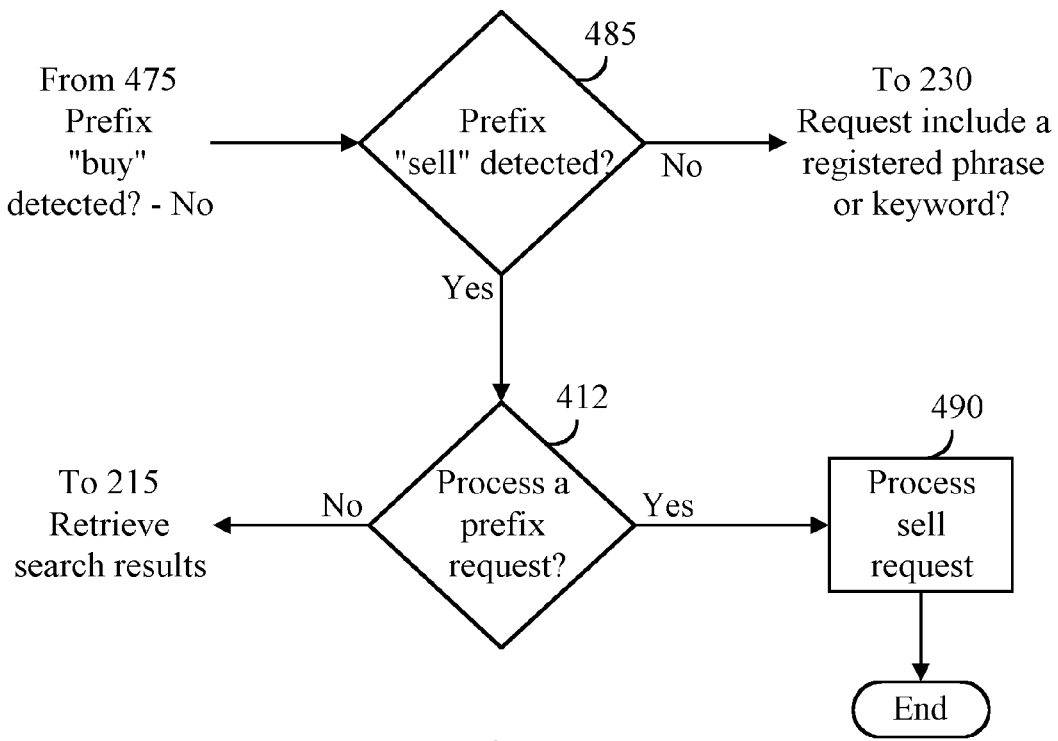
FIG. 4e is a flowchart illustrating the steps performed for processing a sale request in response to detecting a "sell" domain name prefix from an input request in accordance with the present invention.

FIG. 4e illustrates how a "sell" prefix may be used as part of a search request to initiate selling services in accordance with the present invention. After it is determined in step 475 that the prefix "buy" was not parsed, it then may be determined in step 485 whether the prefix "sell" was parsed. If not, then it may be determined in step 230 as to whether the search request includes a registered phrase or keyword. When it is determined in step 485 that the prefix "sell" was parsed, it is then determined in step 412 how the prefix request is processed. If the parsed prefix does not result in processing a selling request in step 490 then search results may be retrieved in step 215.

Figure 5A:
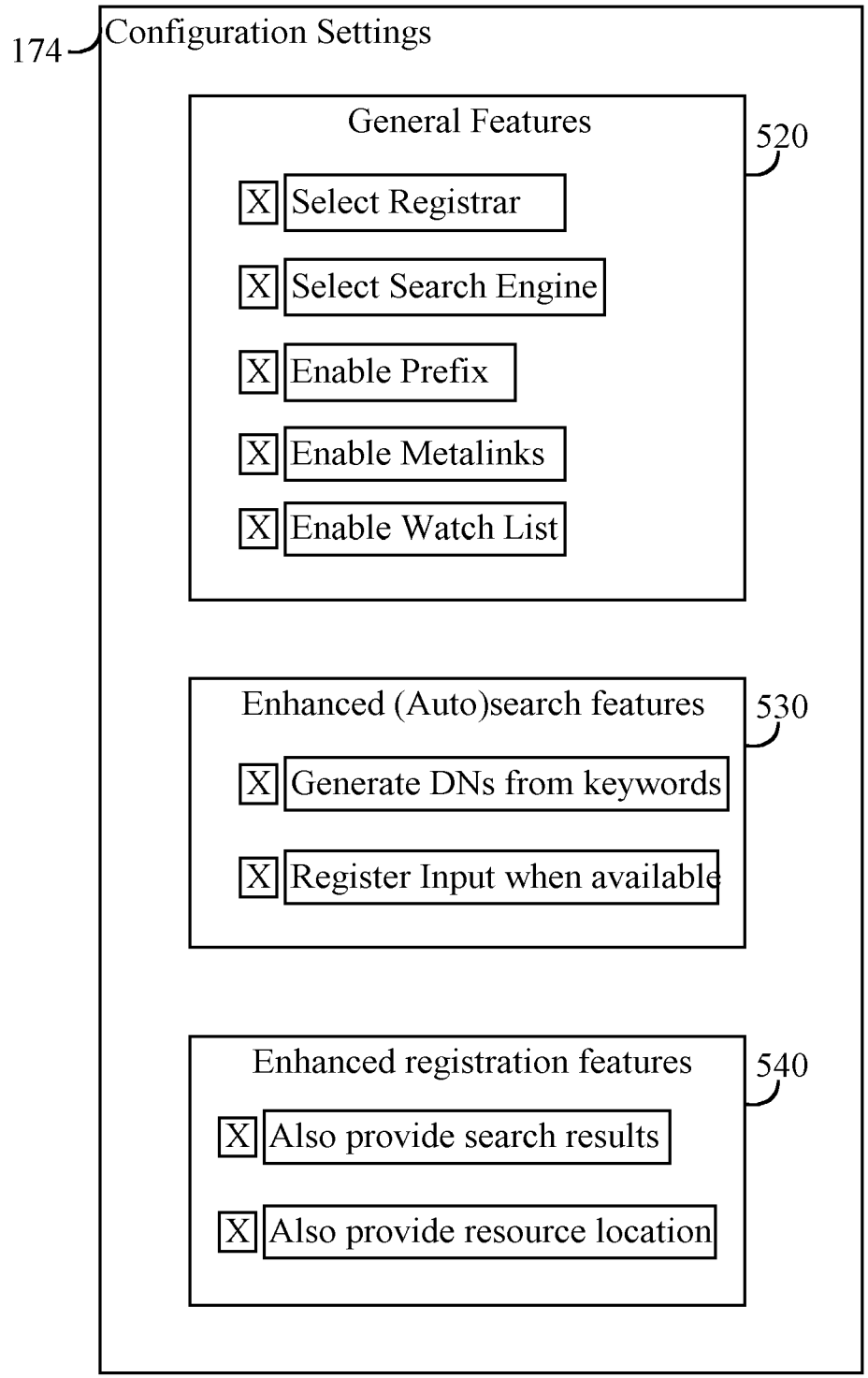
FIG. 5a is a diagram depicting an exemplary configuration settings interface in accordance with the present invention for selecting how an input request may be processed.

FIG. 5a illustrates user modifiable configuration settings 174, which may be accessed for determining how to process an input request. Configuration settings 174 may include general features 520, search features 530, and registration features 540. General feature settings 520 may include a method for selecting redirection to a registrar and/or search engine. Such settings may further include the enabling of a watch list (see FIG. 9b), prefixes (e.g., registration commands), and/or the enabling of metalinks. Enhanced search features 530 may include combining search results with the generation of domain names in response to a search request and/or providing a means for registering any input determined to be available (e.g., VDN, FDN, keyword or phrase). Enhanced registration features 540 may include combining registration results with the results of a search request from the input of a registration request and/or the ability to include resource location in response to a registration request. Other configuration settings that are not shown may be applied by those skilled in the art to perform any aspect of the present invention.

Figure 5B:
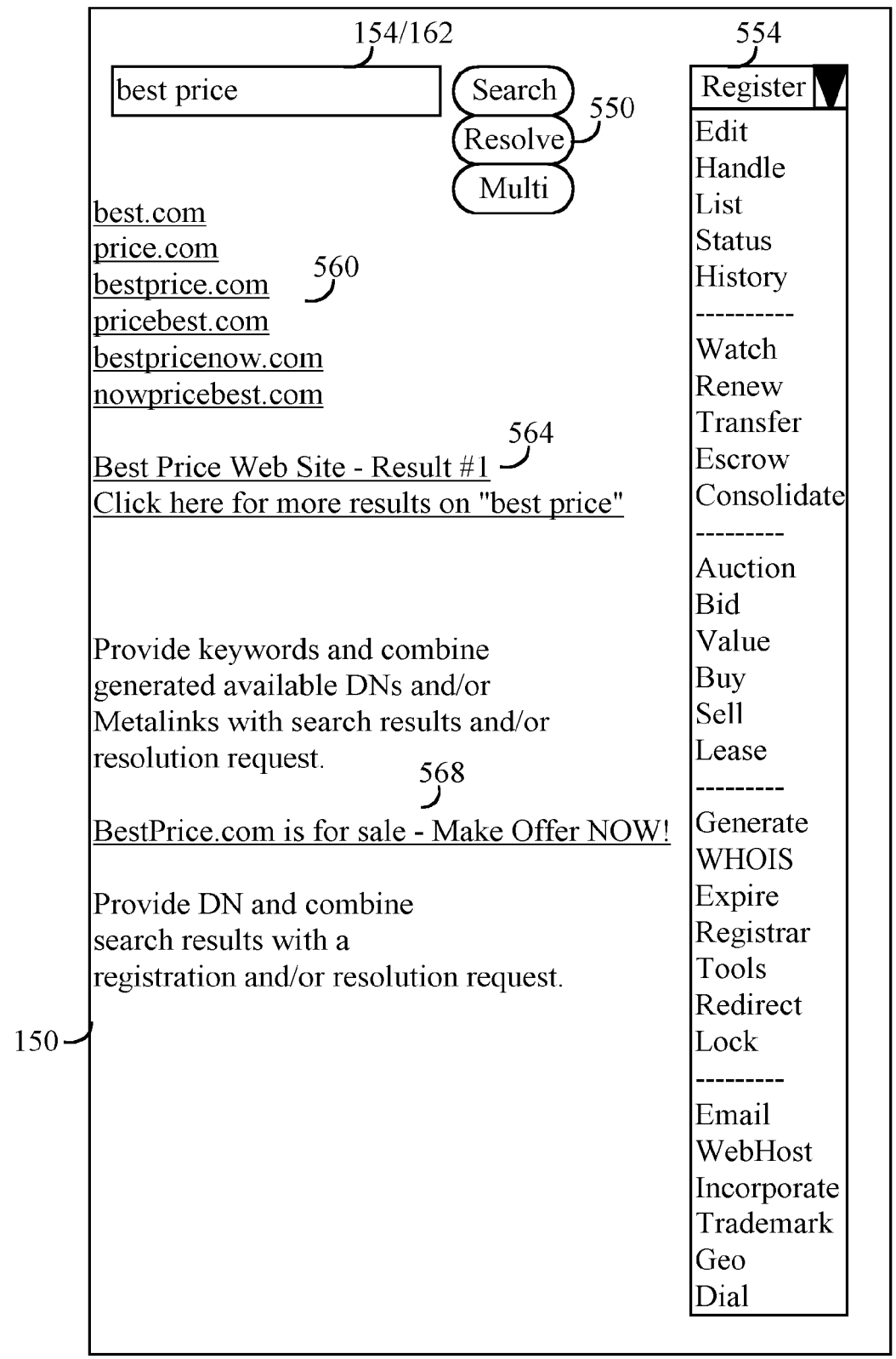
FIG. 5b illustrates a web page having a request form and resulting content from the use of such a request form in accordance with the present invention.

FIG. 5b illustrates a web page having a request form and resulting content from the use of such a request form. A web page 150 may include a user interface element such as a location field 154 or search text box 162 for receiving an input request. Other user interface elements such as button objects 550, list boxes 554, and menu lists may also be included. For example, button objects 550 (e.g., Search, Resolve, Multi) may be used to process an input request. A Search button may process input as a search request. A Resolve button may process input as a resolution request. A Multi button may integrate the results of a search, resolution and/or registration request. For this illustration, a list box 554 may include a plurality of prefixes used for processing an identifier such as a domain name as input received from a location field 154 or search text box 162. For example, When "best price" is entered as input, results of generated domain names determined to be available 560 are displayed in conjunction with search results for "best price" 564. In addition, metalinks may also be integrated 568 with search results and/or resolution request. For instance, the search engine may consult a domain name status database 198 and determine that the domain name "bestprice.com" is currently for sale. A metalink for accessing more information on the sale or after market status of the domain name is generated and integrated 568 with search results.

Identifier prefixes may be used as a command language by entering such a prefix in conjunction with an identifier and/or other parameters into a user interface element such as a microphone with speech to text translation, a web browser location field 154, a web page search text box 162, or command line of a computing device, etc. Such prefixes may also be selected from a list of prefixes as a means for processing an identifier as input. A prefix database 182 may be used in conjunction with templates 186 to generate a URI that may be used for processing an operative function upon the identifier that corresponds to the selected prefix. The following are examples of how prefixes may be used for domain names.

Edit example.com" may enable a registrant of the domain name "example.com" to edit contact information stored in the registrar database. "Handle example.com" may enable a user to list or edit any handles that may correspond to the domain name "example.com". "List example.com" may enable a user to display all records that may correspond to "example.com". "Status example.com" may enable a user to review the current status of "example.com". "History example.com" may enable a user to review the transaction history of "example. com". "Watch example.com" may enable a user to add "example.com" to a watch list for notifying the user as to similar domain names registered or to notify that "example. com" is available or may soon be available for registration. "Renew example.com" enables a registrant to extend the expiry date of "example.com" and provide the option of transferring from one registrar to another. "Transfer example.com RegistrarA to RegistrarB" may enable a registrant to transfer "example.com" from a current registrarA to a new registrarB. "Escrow example.com" may enable a registrant to hold "example.com" in escrow for the purposes of transferring the domain name. "Consolidate example.com" may enable a registrant to list all of the registered domain names of a registrant or given handle for the purpose of minimizing renewal payments across a portfolio of domain names.

"Auction example.com may enable a registrant to list "example.com" for auction". "Bid example.com" may enable an entity to make a bid on "example.com". "Value domain name" may enable a user to receive an estimate of the book value or inventory value for "example.com". "Buy example. com" may enable an entity to make a solicitation for purchase or to purchase "example.com" from the current registrant. "Sell example.com" may enable a registrant to list "example. com" for sale. "Lease example.com" may enable an entity to make a solicitation for leasing or to lease "example.com" from the current registrant.

"Generate example.com" may generate a variety of related domain names that are available (e.g., "firstexample.com", "anotherexample.com", etc.). "WHOIS example.com" may enable a user to list the WHOIS record for "example.com". "Expire example.com" may enable a user to list the expiration date for "example.com". "Registrar example.com" may enable a user to list which registrar "example.com" is registered with. "Tools example.com" may enable an entity to use online tools to find more information on "example.com" such as zone files, nameservers, subdomains, and the like. An example of such online tools may be accessed from a URL such as "http://domtools.com/domtools/". "Redirect example.com" may enable a registrant to configure "example.com" to redirect to another URL. "Lock example. com" may enable a registrant to assure that "example.com" may not be transferred to another registrar until the registrant unlocks the domain name.

"Email example.com" may enable a registrant to sign up for email services for "example.com". "Webhost example.com" may enable a registrant to sign up for web hosting services for "example.com". "Inc example.com" or "LLC example.com" may enable a registrant to submit articles or incorporation/organization and form a business entity for "example.com". "Trademark example.com" may enable a registrant to file a trademark for "example.com". "Geo example.com" may enable a user to receive GPS coordinates from a GPS system or the current latitude/longitude for "example.com". "Dial example.com" may enable a user to make a telephone call to a phone number designated by the registrant of "example.com". For instance, the URL "http://example.com/index.html" may launch a dialer program or redirect to an Internet telephone protocol for contacting the registrant instead of or in addition to accessing a web site. Domain names are generally used as identifiers to access a web site or the like. There are no such domain names used for the explicit purpose of dialing a telephone number instead of accessing a web site. Specification of an Internet telephone protocol is provided in A. Vaha-Sipila, "Informational RFC (Request for Comment) 2806: URLs for Telephone Calls", Internet Engineering Task Force (IETF), April 2000, "http://www.faqs.org/rfcs/rfc2806.html", which is herein incorporated by reference.

FIG. 6a illustrates a typical output from the results of a search request. The search request used is the phrase "software patent". For illustrative purposes, only the first four search results are shown. The first line of a given result may be underlined indicating a hyperlink reference. The hyperlink accesses the URL displayed in the last line of each given search result.

FIG. 6b illustrates modifications made to the output of the search request to extend functionality of the search results. A second line of metalinks may be added to each search result enabling the user to retrieve meta-information about the URI such as WHOIS, Homepage, <META> tag Information, Page Source, Sitemap information, and after market domain name status. Steps (420, 430) for providing such added results are shown in FIG. 4. For instance, the URI for a sitemap may be determined from a variety of methods including access to a sitemap database 184, which may be compiled from a web site such as "sitemap.net" or maintained by having a "crawler" program interrogate the web site of the URI by searching for a sitemap link on the homepage or any other accessible web page or by finding a directory called "sitemap" or a filename called "sitemap.htm" (or ".html"). The after market domain name status may be determined in a similar manner to that of a sitemap. A domain name status database 198 may be maintained by having a "crawler" program interrogate a myriad of after market web sites that list and/or auction domain names.

FIG. 6c illustrates the page source of the output shown in FIG. 6b. By extracting the domain name from the URI, other URIs may be generated and displayed to yield meta-information based on the context of the original URI. Though direct links to meta-information are shown; such links may first access a central source and then URI redirection may be applied to track visits, IP addresses, previous URIs, demographic information, etc. for the purposes such as accounting, marketing, advertising, and distribution.

When a domain name is received as input to a registration service, the availability of the domain name is determined. If the domain name is not available, registrant information is returned and the client is notified that the domain name in question is not available and may provide the option of checking the availability of other domain names. When a domain name is available, a user may be presented with the choice of registering the domain name. Upon completion of registration, another domain name may then be checked for availability.

Figure 7A:
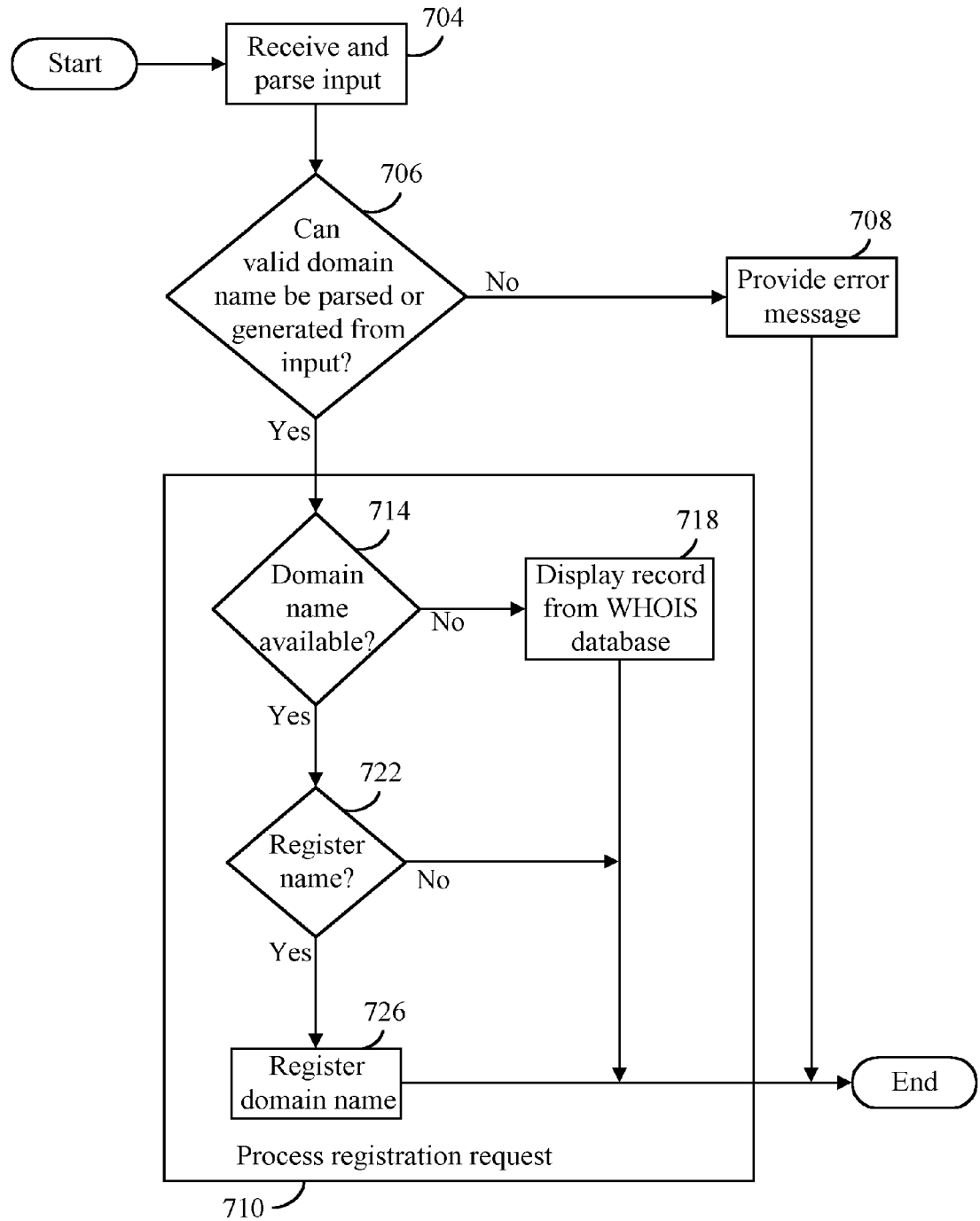
FIG. 7a is a flowchart illustrating the steps performed by a prior art system for registering a domain name.

FIG. 7a illustrates such a registration service. A device such as a network access apparatus 110, servlet, applet, stand-alone executable program, or a user interface element such as a text box object, receives and parses input in step 704. It is then determined in step 706 whether a valid domain name may be parsed or generated from input. When input can not be processed as a registration request then an error message may be provided in step 708 otherwise a registration request may be processed in step 710 for each valid domain name. To process such a request, availability of the domain name 306 may be determined in step 714. If the domain name 704 is determined to not be available in step 314, then a record from a corresponding WHOIS database may be retrieved and displayed in step 718. Because WHOIS requests are so heavily relied on, methods for minimizing network bandwidth of these services are considered preferable. For instance, a browser 112 may be configured to first access a client WHOIS cache and/or a series of distributed WHOIS caches 188 to increase lookup performance. Such caches may be distributed in a manner similar to the DNS wherein each WHO'S cache may make further hierarchical reference to the next successive WHOIS cache until a definitive result has been found.

When the domain name 704 is determined available in step 714, then such information may be displayed accordingly, prompting the client to register the domain name in step 722. When it is determined in step 722 that the client may wish to register the domain name 704, further information may be displayed to assist the user in registering the domain name in step 726.

Figure 7B:
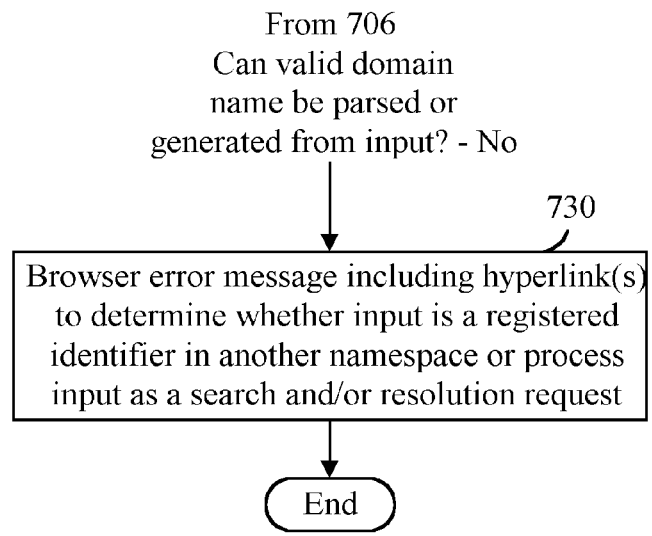
FIG. 7b is a top level flowchart illustrating the step performed of providing an error message in response to the determination that a domain name can not be generated or parsed in accordance with the present invention.

FIG. 7b is a top-level flowchart showing how an error message may be used in accordance with the present invention. When it is determined in step 706 that a valid domain name may not be parsed or generated from input, a more specific error message is provided in step 730 that may include hyperlinks to determine whether input may be a registered identifier in another namespace or a link to process input as a search and/or resolution request. In addition, further options such as modifying configuration settings 174 may also be included as hyperlinks in such a resulting web page or error message.

Figure 7C:
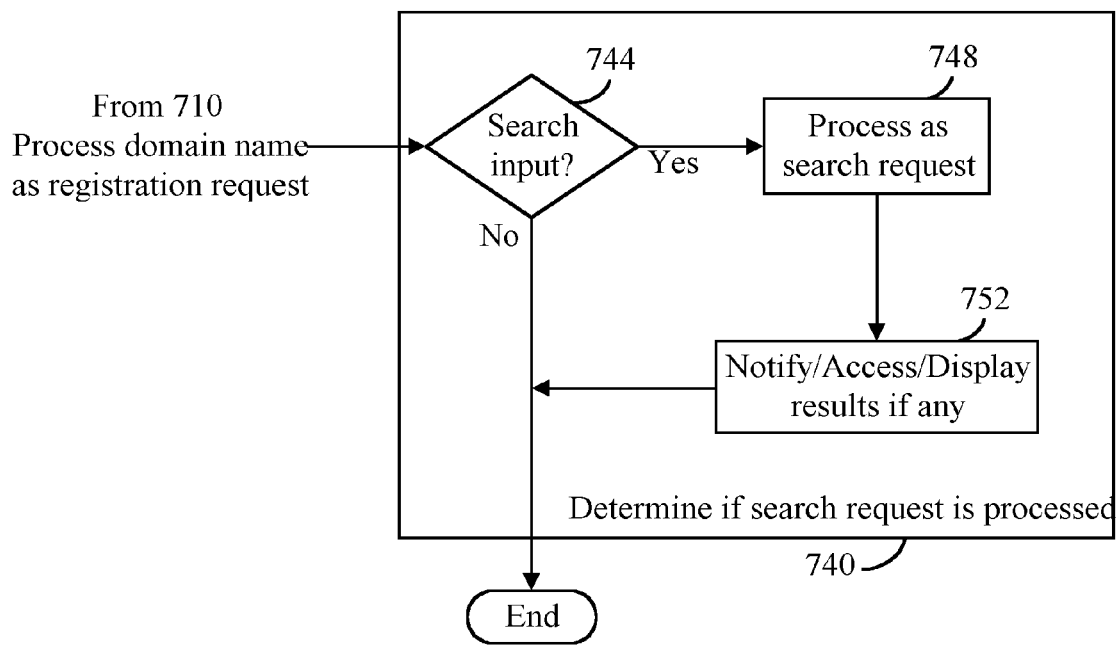
FIG. 7c is a flowchart illustrating the steps performed for providing search services in response to registration services in accordance with the present invention.

FIG. 7c is a flowchart illustrating a methodology for performing a search request after a completed registration request. After the registration request is processed in step 710, it may be determined in step 740 by accessing configuration settings 174 whether a search request may be processed. More specifically, it may be further determined in step 744 whether received input is to be processed as a search request in step 748. When this is the case, a search request is constructed from the identifier (e.g., domain name) and processed in step 748 and results if any may then be notified, accessed, and/or displayed in step 752.

FIG. 7d is a flowchart illustrating a methodology for combining the results of performing a search request while processing a registration request. When input is parsed and received in step 704 it is determined in step 760 whether search results may be combined with results from the registration request (step 710) by accessing configuration settings 174. When this is the case, search results from input may be retrieved in step 764. If not, then it may be determined in step 768 whether input includes any keywords. If there are no keywords then it may be determined in step 706 whether a valid domain name may be parsed or generated from input. If so, then a registration request may be processed in step 710, otherwise search results from input may be retrieved in step 764. When any keywords have been detected, at least one domain name for each keyword and/or combination of at least two keywords may be generated in step 780. Results of a registration request including search results, if any, may be provided in step 784.

FIG. 7e is a flowchart illustrating a methodology for providing metalinks with the results of a registration request (e.g., WHOIS request). When it is determined in step 714 that a domain name is not available, a record from the WHOIS database may be displayed including metalinks for accessing <META> tag information from the URI of a domain name to access content from corresponding web site, a hyperlink for dialing or faxing a telephone number, a hyperlink for accessing a map or guide to locate a postal address and/or surrounding local services, and a hyperlink for accessing the after market status of the domain name which may include a sale price by the registrant or from an auction and/or listing service.

FIG. 7f depicts the results of a WHOIS request for a domain name. The input request used may be the domain name "example.com". FIG. 7g illustrates a methodology for extending functionality of WHOIS results by modifying the page source of a typical WHOIS request. For instance, the domain name "example.com" may be converted into a hyperlink reference and/or metalink 792 so that a user may readily visit the homepage and/or sitemap of "example.com". Also illustrated are hyperlinks 794 for accessing geographic information (e.g. maps) that corresponds to the domain name, and hyperlinks for dialing the telephone 796 so that the source or registrant of the domain name may be readily contacted if so desired. In addition, a hyperlink reference may be added to indicate that the domain name is available for sale 798 enabling access to an auction site, listing service, domain name broker, or the like. The domain name status database 198 is consulted in response to the WHOIS request and zero or more hyperlinks of after market information may be generated and integrated into the page source from the results of the WHOIS request.

Figure 8:
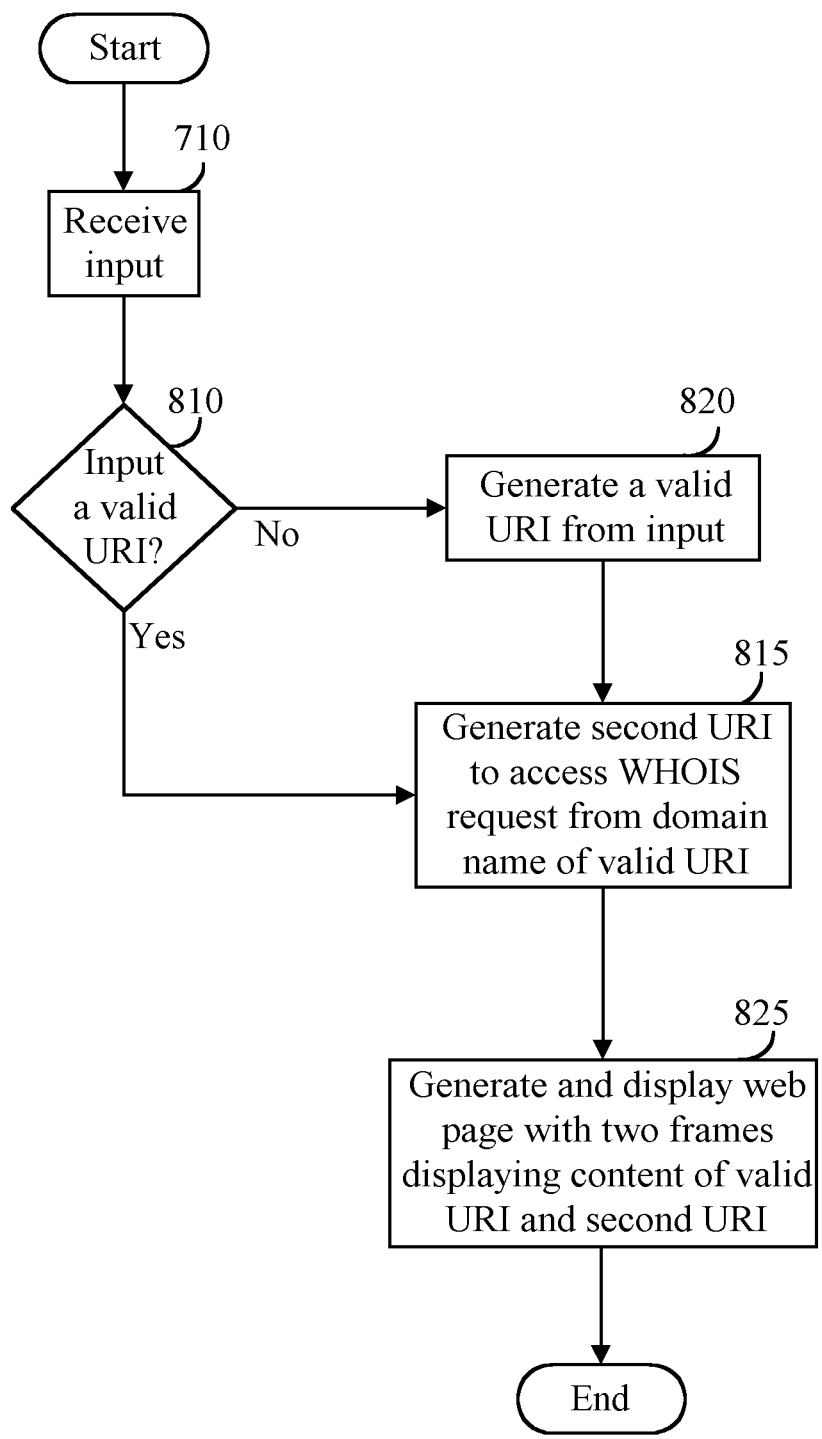
FIG. 8 is a flowchart of the steps performed for extending the functionality of an input request in accordance with the present invention.

Referring now to FIG. 8, steps are illustrated which show how a resolution request or search request may be modified to extend functionality. A device such as a network access apparatus 110, command line, servlet, applet, script, stand alone executable program having an input object such as a text, or web browser 112 receives 710 input having a domain name. When input is received in step 710, it may be determined in step 810 whether the input is a valid URI. When the input is a valid URI, then a second URI may be generated in step 815 from the domain name of the valid URI for accessing a WHOIS record corresponding to the domain name. However when the input is not a valid URI, then a URI may be generated in step 820 from the input and then a second URI may be generated in step 815 from the domain name of the generated URI to access a WHOIS record corresponding to the domain name. In either case, a web page with two frames may be generated and displayed in step 825 having both the content of the generated or valid URI (810, 820) and the second URI 815.

Figure 9A:
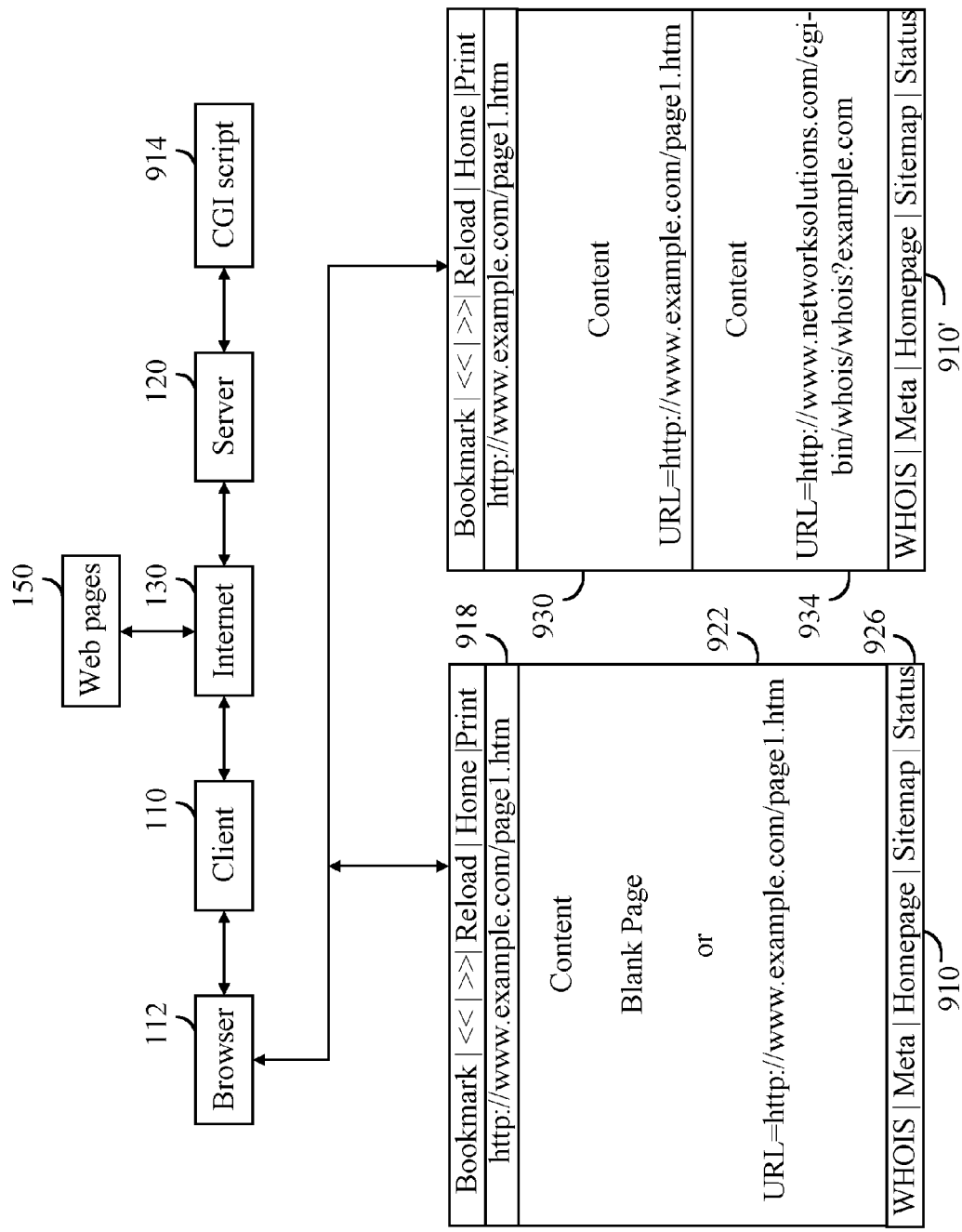
FIG. 9a is an illustration of how results may be displayed in a web browser in accordance with the present invention.

Turning now to FIG. 9a, illustrations of web pages are displayed which correspond to steps shown in FIG. 8. A client 110 web browser 112 having a web page 910 may be used to connect to a server 120 via the Internet 130 that runs a CGI script 914. The location field of the web browser 112 is suppressed and the web page 910 displays at least two frames. The first frame is the web based location field 918 and the second frame 922 may be used to display the contents 150 of a web address. An input device (e.g. keyboard, mouse, pen light, touch screen, or microphone etc.) of a client computer or network access apparatus 110 is used to receive a web address as input either directly from a hyperlink (not shown) in the web page 910, or from the location field 918 of the web page 910. A URL GET or POST request may be generated from the input and the browser 112 forwards the request to a server 120, which processes the request by executing a CGI script 912 to generate output (as discussed in FIG. 8) by requesting the generated pages 910' and sending the content (930, 934) to the browser 112. The location field 918 of the first frame may either persist by displaying the input or may be cleared for the next web address. The content 150 of the input URI may be displayed in a first frame 930 of the web page 910' whereas the content of the second frame 934 may be dynamically generated by corresponding the extracted domain name from the input URI as a search term to generate a second URI which corresponds to a WHOIS record of the domain name. For instance, when a first URI "http://www.example.com/page1.htm" is received as input, a script extracts "example.com" from the URI and generates a second URI: "http://www.networksolutions.com/cgi-bin/whois/whois?example.com"

Both the first URI and second URI may be generated as frames and displayed as a web page 910'. The content of the first page 922 may already have the results of the URI "http://www.example.com/page1.htm", in which case, a third frame 926 having hyperlinks of dynamically generated URI meta-information such as WHOIS, Homepage, <META> tag information, Page Source, Sitemap, and after market status information (as discussed in FIG. 6b) may be displayed. These hyperlinks dynamically extract the domain name from the current URI to form metalinks on the fly so that at any given time one may access meta-information of the current URI. For instance, when clicking on the WHOIS metalink, the web page 910' as discussed above is generated and may display meta content as a split screen or in a pop-up window, etc.

The following discussion introduces certain concepts required for understanding the object oriented developer environment and the object oriented programming environment employed to construct the preferred embodiment and carry out the methods of the present invention. It is assumed here that the reader is familiar with the notion that an "object", for purposes of computer modeling, comprises a plurality of data items or properties, has a behavior, responds to messages from other objects, and issues messages to other objects. It will be understood that the invention could be made and used with any object-oriented development environment, such as C++, Java, or other object-oriented programming environment.

Various terms have emerged in the art to capture various aspects of "object-oriented" approaches. These terms include the words encapsulation, classes, inheritance, message-passing, and polymorphism. The term "classes" relates to objects of similar types. Objects of the same class are grouped together and have certain properties, attributes, or behaviors in common. Classes may be organized into hierarchies of subclasses in which the procedures and attributes of the class are inherited by its subclasses. Thus, a "subclass" is a group of objects that have some properties, attributes, behaviors, or procedures with other groups of objects, but could have other properties, attributes, behaviors, or procedures that are different. The term "attribute" or "property" relates to data items or information or behavior that relates to a particular object. The term "inheritance" means the sharing of properties, and in some cases, attributes and behaviors, that characterizes a subclass by its parent class. The notion of inheritance purportedly allows for easier maintenance and extension of computer programs since creation of subclasses purportedly allows the program code used to created the parent class to be readily modified and reused for subclasses. An object's "procedures" or "methods" are operations upon data items, attributes and/or properties so as to cause a computing result and provide a response. Certain aspects of object-oriented programming techniques are utilized in the present invention so as to provide extended functionality to the user interface as applied to network systems.

There is a specific model called document object model (DOM) that defines a set of classes used for the manipulation of document objects. JavaScript is a scripting language that relies on DOM when making function calls for Internet related applications. Most of these objects are directly related to characteristics of the Web page or browser. There is a class of objects specifically applied to the manipulation of URLs, which for the purposes of discussion is called a URI object.

In an aspect of the present invention a new object is instantiated called a MetaURI Object, which inherits the properties and is a subclass of the URI object. In addition, other objects (e.g. WHOIS Object, HLD Object, etc.) are instantiated, which are subclasses of the MetaURI object. It is desirable for a user to obtain meta-information at any given time during a user's navigation experience (e.g. on the Internet, Intranet or a web cache or file system offline, etc.). As each URI is accessed the properties of the MetaURI object are updated including any other related objects such as the WHOIS object to reflect values associated with the current URI. In turn, any associated document objects are automatically updated as well. There are many applications for the WHOIS object. For instance, the WHOIS object may be integrated into bookmarks 196 (including favorites folder), URL history folder 194, or even as part of the location field 154. In addition, by using any menu such as a right-click menu or an action menu, an extra option is listed to retrieve WHOIS information based on the URI properties of the selected object. A modified WHOIS function is programmed to extract a domain name from the URI property to be passed as a parameter for retrieving contact information from the proper WHOIS database.

Bookmarks in Netscape are stored in an HTML file having an anchor reference tag for maintaining the properties of a given bookmark when used in conjunction with a bookmark viewer. The following is an example of one such reference.

---

<A HREF="http://164.195.100.11/netahtml/search-adv.htm" ADD_DATE="952124784" LAST_VISIT="25920000" LAST_MODIFIED="25920000">USPTO</A>

---

In another aspect of the present invention modifications may be made to the bookmark viewer so that an extra WHO'S field may be added to the anchor reference when a page is bookmarked.

tion may be used for reviewing registrant information while offline from the network, for example.

Domain names that are soon to be available may be distributed in advance to a user so that domain names of interest may be selected and reserved in a preordering queue on either the client or server side. Registration information is completed and a registration form is submitted to or by a registrar when the soon to be available domain name that is selected does become available.

Figure 9B:
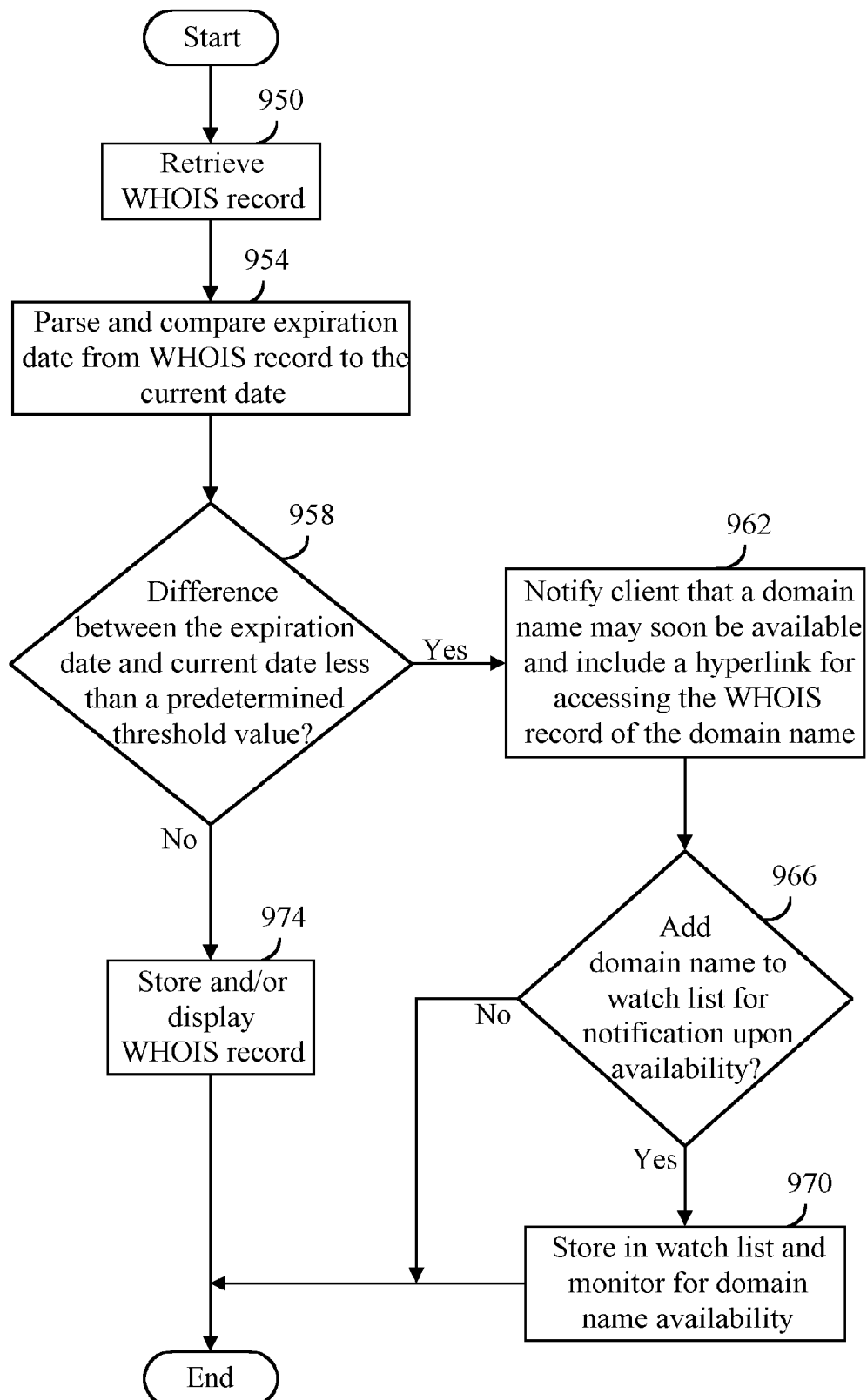
FIG. 9b is a flowchart illustrating a methodology for notifying a client that a domain name is available or may soon be available for registration in accordance with the present invention.

FIG. 9b is a flowchart illustrating a methodology for notifying a client that a domain name is available or may soon be available for registration. A WHOIS record may be retrieved by initiating a WHOIS request or retrieved in response to processing a resolution request, search request, and registration request. Whatever the case, whenever a WHOIS record is retrieved (step 950), the expiration date for the domain name of the WHOIS record is parsed and compared in step 954 to the current date. When the difference between the expiration date and current date is determined in step 958 to be less than a predetermined threshold value (e.g., 30 days), a client may be notified in step 962 that the domain name may soon be available. Upon notification, the client may determine in step 966 whether to add the domain name to a watch list for further notification upon domain name availability. If so, then the domain name is stored in a watch list 192 and monitored for domain name availability in step 970. Metalinks may be included with any notification for accessing the WHOIS record of the domain name and corresponding URI. When the difference is determined in step 962 to be greater than the threshold, the WHOIS record may be stored and/or displayed in step 974. The threshold value (not shown) may be modified in the configuration settings 174.

Though the above aspects demonstrate how URIs may be resolved based upon a web-based version of a location field, similar teachings may be applied to those skilled in the art by providing a user interface element such as a text box object as input. The text box object may be located anywhere and on any web page including a text box that may be embedded or displayed as part of an on-line advertisement. The text box object may be used in a stand-alone application (e.g., instant messaging, custom toolbar, etc.) or stored on magnetic and/or optical media that may be non-volatile, writable, removable, or portable. The text box object may be incorporated as an applet or servlet and embedded in other applications. The text box may be integrated in the task bar or any part of the GUI's OS, or the OS bypassed and a user interface element overlaid as a graphic on a display device based on modifications to a video card and/or it's associated firmware or software drivers. A command line text box may be further overlaid as an interactive object in other embodiments such as Internet television, cable television, digital television, or interactive television through an Internet appliance or set top box.

---

<A HREF="http://164.195.100.11/netahtml/search-adv.htm"
ADD_DATE="952124784" LAST_VISIT="25920000" LAST_MODIFIED="25920000"
WHOIS="http://www.networksolutions.com/cgi¬bin/whois/whois?uspto.gov">USPTO</A>

---

The history folder 194 or domain name status database 198 may be modified in a similar manner except that due to its size such data is saved in a compressed format. For instance, by enabling the history folder 194 to correspond metalinks in real-time while surfing the network, a WHOIS cache 188 may be generated as each URI is being requested. This informa- Those skilled in the art may make and use software program that functions as a browser plug-in. Such a program may be downloaded and installed for integration into the command line of a device or location field 154 of a browser program 112. Modifying the source code of the browser program 112 itself, if need be, may be more desirable, in effect, enabling tens of millions of users to take advantage of integrated name resolution and registration services. In the case of MSIE, modifications may be made to the script on the server "auto.search.msn.com" that generates the "response.asp" web page and all unresolved domain names may be redirected to a licensed registrar rather than processed as a search request. A template may be created and used in the registry of the MSIE autosearch feature. The template may further include which server to access for transparently performing a WHOIS request and/or access the server of a desired registration service of an accredited registrar.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

What is claimed is:

1. A method comprising:
   receiving, at a client computing device, a search request comprising at least one identifier and at least one identifier prefix;
   determining the at least one identifier prefix;
   generating a uniform resource locator (URL) corresponding to the at least one identifier prefix by inserting the identifier into a template corresponding to the at least one identifier prefix, the URL configured to redirect a specific request corresponding to the at least one identifier prefix to at least one computing device configured to effect the specific request, wherein the specific request comprises, at least in part, performing at least one identifier management function on a target identified by the at least one identifier;
   wherein the at least one identifier management function comprises at least one of an edit command, a handle command, a list command, a status command, a history command, a watch command, a renew command, a transfer command, an escrow command, a consolidate command, an auction command, a bid command, a value command, a buy command, a sell command, a generate command, a whois command, an expire command, a registrar command, a tools command, a redirect command, a lock command, an email command, a webhost command, an incorporation command, a trademark command, a geo command, or a dial command; and
   wherein the at least one identifier comprises at least one of a keyword, a domain name, or a fictitious domain name.

2. The method of claim 1, wherein the receiving the search request comprises receiving the search request from a web page having at least one of a location field or search text box for receiving an input.

3. The method of claim 1 further comprising providing a listing of identifier prefixes.

4. The method of claim 1, wherein the at least one identifier prefix comprises a transfer prefix, wherein the URL is configured to redirect the client computing device to registrar services for transferring the identifier from one registrar to another.

5. The method of claim 1, wherein the at least one identifier prefix comprises a renew prefix, wherein the URL is configured to redirect the client computing device to registrar services to process a renewal registration request.

6. The method of claim 1, wherein the at least one identifier prefix comprises a buy prefix, wherein the URL is configured to redirect the client computing device to initiate purchasing services.

7. The method of claim 1, wherein the at least one identifier prefix comprises a sell prefix, wherein the URL is configured to redirect the client computing device to initiate selling services.

8. The method of claim 1, wherein the at least one identifier prefix comprises an edit prefix, wherein the URL is configured to redirect the client computing device to edit contact information in the a registrar database.

9. A non-transitory computer readable medium having instructions stored thereon that, in response to execution by a computing device, cause the computing device to perform operations comprising:
   receiving a search request comprising at least one identifier and at least one identifier prefix;
   detecting the at least one identifier prefix;
   generating a uniform resource locator (URL) corresponding to the at least one identifier prefix by inserting the identifier into a template corresponding to the at least one identifier prefix, the URL configured to redirect a specific request corresponding to the at least one identifier prefix to at least one other computing device configured to effect the specific request, wherein the specific request comprises, at least in part, performing at least one identifier management function on a target identified by the at least one identifier;
   wherein the at least one identifier management function comprises at least one of an edit command, a handle command, a list command, a status command, a history command, a watch command, a renew command, a transfer command, an escrow command, a consolidate command, an auction command, a bid command, a value command, a buy command, a sell command, a generate command, a whois command, an expire command, a registrar command, a tools command, a redirect command, a lock command, an email command, a webhost command, an incorporation command, a trademark command, a geo command, or a dial command; and
   wherein the at least one identifier comprises at least one of a keyword, a domain name, or a fictitious domain name.

10. The non-transitory computer readable medium of claim 9, wherein the receiving the search request comprises receiving the search request from a web page having at least one of a location field or search text box for receiving an input.

11. The non-transitory computer readable medium of claim 9 further comprising instructions configured to cause the computing device to perform operations comprising providing a listing of identifier prefixes.

12. The non-transitory computer readable medium of claim 9, wherein the at least one identifier prefix comprises a transfer prefix, wherein the URL is configured to redirect the client computing device to registrar services for transferring the identifier from one registrar to another.

13. The non-transitory computer readable medium of claim 9, wherein the at least one identifier prefix comprises a renew prefix, wherein the URL is configured to redirect the client computing device to registrar services to process a renewal registration request.

14. The non-transitory computer readable medium of claim 9, wherein the at least one identifier prefix comprises a buy prefix, wherein the URL is configured to redirect the client computing device to initiate purchasing services.

15. The non-transitory computer readable medium of claim 9, wherein the at least one identifier prefix comprises a sell prefix, wherein the URL is configured to redirect the client computing device to initiate selling services.

16. The non-transitory computer readable medium of claim 9, wherein the at least one identifier prefix comprises an edit prefix, wherein the URL is configured to redirect the client computing device to edit contact information in the a registrar database.

17. A method comprising:
receiving, at a computing device, a search request;
in response to receiving the search request, retrieving at least one search result comprising a uniform resource identifier (URI) having a domain name;
in response to retrieving the at least one search result, generating at least one hyperlink corresponding to the URI having the domain name, the at least one hyperlink configured to, in response to selection thereof, effect access of additional information relating to a resource indicated by the URI having the domain name, wherein the additional information comprises at least one of:
sitemap information in response to the resource indicated by the URI does not include sitemap information;
homepage information in response to the resource indicated by the URI does not include homepage information;
WHOIS information in response to the resource indicated by the URI does not include WHOIS information;
page source information in response to the resource indicated by the URI does not include page source information;
meta tag information in response to the resource indicated by the URI does not include meta tag information; and
generating enhanced search results by combining the search result having the URI with the at least one hyperlink corresponding to the URI.

18. The method of claim 17 further comprising generating a second line of hyperlinks comprising the at least one hyperlink.

19. The method of claim 17 further comprising retrieving the sitemap information from at least one of a sitemap database, a web site, or a crawler program.

20. The method of claim 17, wherein the search request comprises at least one of a valid domain name, fictitious domain name, keyword, or registered keyword.

21. The method of claim 17, wherein the search request comprises at least one keyword, the method further comprising generating a second domain name including at least a portion of the at least one keyword, wherein the search results include the second domain name.

22. A non-transitory computer-readable medium having instructions stored thereon that, in response to execution by a computing device, cause the computing device to perform operations comprising:
receiving a search request;
in response to receiving the search request, retrieving at least one search result comprising a uniform resource identifier (URI) having a domain name;
in response to retrieving the at least one search result, generating at least one hyperlink corresponding to the URI having the domain name, the at least one hyperlink configured to, in response to selection thereof, effect access of additional information relating to a resource indicated by the URI having the domain name, wherein the additional information comprises at least one of:
sitemap information in response to the resource indicated by the URI does not include sitemap information homepage information in response to the resource indicated by the URI does not include homepage information;
WHOIS information in response to the resource indicated by the URI does not include WHOIS information;
page source information in response to the resource indicated by the URI does not include page source information;
meta tag information in response to the resource indicated by the URI does not include meta tag information; and
generating enhanced search results by combining the search result having the URI with the at least one hyperlink corresponding to the URI.

23. The non-transitory computer readable medium of claim 22 further comprising instructions configured to cause the computing device to perform operations comprising generating for display at least two lines of hyperlinks comprising the at least one hyperlink.

24. The non-transitory computer readable medium of claim 22 further comprising instructions configured to cause the computing device to perform operations comprising retrieving the sitemap information from at least one of a sitemap database, a web site, or a crawler program.

25. The non-transitory computer readable medium of claim 22, wherein the search request comprises at least one of a valid domain name, fictitious domain name, keyword, or registered keyword.

26. The non-transitory computer readable medium of claim 22, wherein the search request comprises at least one keyword, the method further comprising generating a second domain name including at least a portion of the at least one keyword, wherein the search results include the second domain name.

* * * * *

UNITED STATES PATENT AND TRADEMARK OFFICE
CERTIFICATE OF CORRECTION

PATENT NO. : 8,458,161 B2
APPLICATION NO. : 13/163076
DATED : June 4, 2013
INVENTOR(S) : Schneider It is certified that error appears in the above-identified patent and that said Letters Patent is hereby corrected as shown below:

On the Title Page, under "Related U.S. Application Data", in Column 1, Line 1, delete Item "(60)" and insert Item -- (62) --, therefor.

On Title Page 4, in Item (56), under "OTHER PUBLICATIONS", in Column 1, Line 15, delete "Schol," and insert -- School, --, therefor.

On Title Page 4, in Item (56), under "OTHER PUBLICATIONS", in Column 2, Lines 12-13, delete "Commision;" and insert -- Commission; --, therefor.

On Title Page 4, in Item (56), under "OTHER PUBLICATIONS", in Column 2, Line 60, delete "possible.;" and insert -- possible; --, therefor.

On Title Page 4, in Item (56), under "OTHER PUBLICATIONS", in Column 2, Line 70, delete "Partipating" and insert -- Participating --, therefor.

On Title Page 5, in Item (56), under "OTHER PUBLICATIONS", in Column 1, Line 9, delete "paragarphs" and insert -- paragraphs --, therefor.

On Title Page 5, in Item (56), under "OTHER PUBLICATIONS", in Column 1, Line 12, delete "paragarphs" and insert -- paragraphs --, therefor.

On Title Page 5, in Item (56), under "OTHER PUBLICATIONS", in Column 1, Line 36, delete "Califorrnia." and insert -- California. --, therefor.

On Title Page 5, in Item (56), under "OTHER PUBLICATIONS", in Column 1, Line 46, delete "Anglees:" and insert -- Angeles: --, therefor.

Signed and Sealed this
Thirteenth Day of May, 2014

Michelle K. Lee
*Deputy Director of the United States Patent and Trademark Office*

CERTIFICATE OF CORRECTION (continued)
U.S. Pat. No. 8,458,161 B2

In the Specification:

In Column 13, Line 47, delete "WVVW-A" and insert -- WWW-A --, therefor.

In Column 18, Line 16, delete "Edit example.com"" and insert -- "Edit example.com" --, therefor.

In Column 18, Line 40, delete ""Auction example.com" and insert -- "Auction example.com" --, therefor.

In Column 21, Line 26, delete "rnetalink" and insert -- metalink --, therefor.

In the Claims:

In Column 26, Line 30, in Claim 8, delete "'the a registrar" and insert -- a registrar --, therefor.

In Column 27, Line 24, in Claim 16, delete "the a registrar" and insert -- a registrar --, therefor.